US010009394B2

(12) United States Patent
Spivey

(10) Patent No.: US 10,009,394 B2
(45) Date of Patent: Jun. 26, 2018

(54) TECHNIQUES TO BROADCAST LIVE EVENT DATA IN REAL-TIME

(71) Applicant: CBS Interactive Inc., San Francisco, CA (US)

(72) Inventor: Darin Spivey, Boca Raton, FL (US)

(73) Assignee: CBS Interactive Inc., New York, NY (US)

( * ) Notice: Subject to any disclaimer, the term of this patent is extended or adjusted under 35 U.S.C. 154(b) by 76 days.

(21) Appl. No.: 14/450,582

(22) Filed: Aug. 4, 2014

(65) Prior Publication Data

US 2016/0036910 A1    Feb. 4, 2016

(51) Int. Cl.
*G06F 15/16* (2006.01)
*H04L 29/06* (2006.01)
*H04L 29/08* (2006.01)

(52) U.S. Cl.
CPC .......... *H04L 65/4069* (2013.01); *H04L 67/26* (2013.01)

(58) Field of Classification Search
CPC .... H04L 65/2823; H04L 67/02; H04L 69/169
USPC ................................................ 709/204, 223
See application file for complete search history.

(56) References Cited

U.S. PATENT DOCUMENTS

| 9,330,139 | B2 | 5/2016 | Chen et al. | |
| 2004/0003038 | A1* | 1/2004 | Huang | G06F 17/30017 709/204 |
| 2005/0210152 | A1 | 9/2005 | Hawes | |
| 2010/0241491 | A1 | 9/2010 | Eglen et al. | |
| 2011/0208787 | A1* | 8/2011 | Sidy | G06F 17/30867 707/809 |
| 2012/0117131 | A1 | 5/2012 | Maruyama et al. | |
| 2013/0018960 | A1* | 1/2013 | Knysz | H04L 65/403 709/204 |
| 2013/0222597 | A1* | 8/2013 | Brink | G06Q 30/0211 348/157 |
| 2013/0227141 | A1 | 8/2013 | Schmidt et al. | |
| 2014/0143376 | A1 | 5/2014 | Beaulac et al. | |
| 2014/0281007 | A1 | 9/2014 | Lemmons et al. | |
| 2015/0180920 | A1* | 6/2015 | Hunter | H04L 67/025 709/203 |

OTHER PUBLICATIONS

Office Action received for U.S. Appl. No. 14/450,620, dated Jul. 6, 2016, 21 pages.
Office Action received for U.S. Appl. No. 14/450,620, dated Apr. 10, 2017, 20 pages.

* cited by examiner

*Primary Examiner* — Wing F Chan
*Assistant Examiner* — Andrew Woo

(57) ABSTRACT

An apparatus to broadcast live event data in real-time includes one or more processor circuits; and a subscription component operatively executing on a processor circuit to receive a topic entry from a message queue server, and to push the topic entry to a subscribed client device substantially simultaneously with the message queue server receiving the topic entry from a live data source. The apparatus may also include a communication component operatively coupled to a processor circuit to open a connection with the client device, and receive a request for a topic from the client device.

15 Claims, 24 Drawing Sheets

*System 100*

1200

RECEIVE A TOPIC ENTRY FROM A LIVE DATA SOURCE

*1202*

SORT THE TOPIC ENTRY INTO A TOPIC QUEUE

*1204*

PUSH THE DATA PAYLOAD OF THE TOPIC ENTRY FROM THE TOPIC QUEUE TO A SERVER SUBSCRIBED TO THE TOPIC QUEUE

TECHNIQUES TO BROADCAST LIVE EVENT DATA IN REAL-TIME

CROSS-REFERENCE TO RELATED APPLICATIONS

This application is related to concurrently filed, and co-owned, application Ser. No. 14/450,620 titled "Techniques to Aggregate and Broadcast Live Event Data in Real-Time", which is hereby incorporated by reference in its entirety.

BACKGROUND

Some content providers, such as news and information services, provide data about live events to users who may not be present at the events. As technology allows users to receive such data away from desktop computers, the demand for live event data in real time on mobile devices has increased. However, the content providers may encounter obstacles to providing the data to mobile devices, in real-time, and with minimal delays.

BRIEF DESCRIPTION OF THE DRAWINGS

FIG. 12 illustrates a second logic flow for the system of FIG. 1.

DETAILED DESCRIPTION

Figure 1:
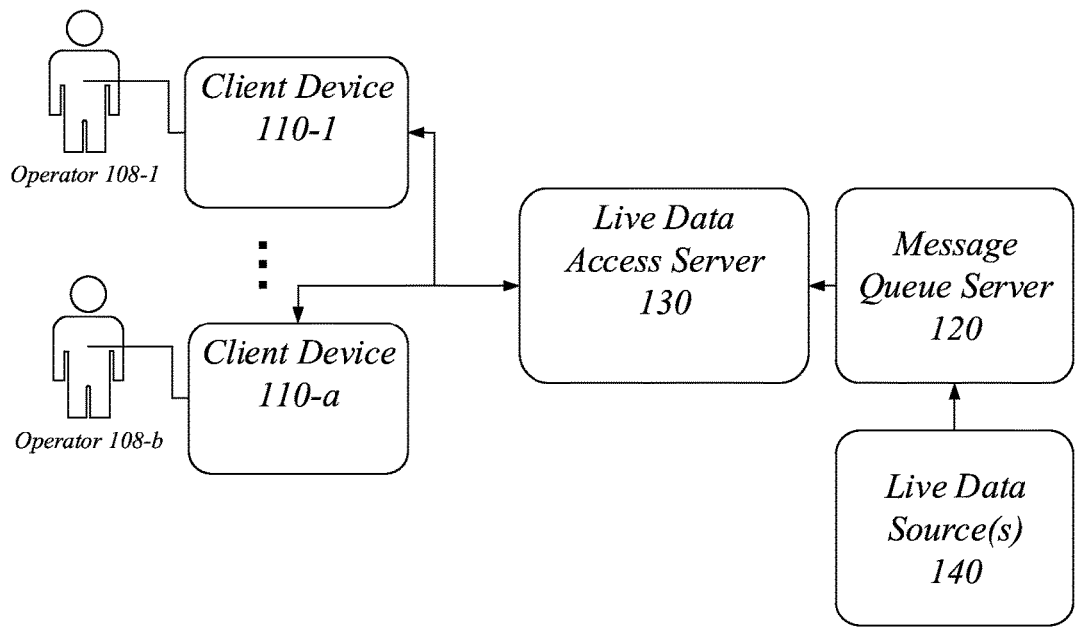
FIG. 1 illustrates an embodiment of a system for broadcasting live event data.

Various embodiments are generally directed to techniques for managing communications of electronic information for electronic devices, such as mobile devices, for example. Some embodiments are directed to techniques to broadcast media content in real-time. The media content may comprise, for example, data from a live event (e.g., news event, a gaming event, sporting event, etc.). In particular, various embodiments increase the speed at which live event data (e.g. sports scores and breaking news), are broadcast to mobile devices by using topic queues and open duplex communication connections, among other innovative techniques.

Conventional live event data content providers may receive data about a live event, such as a sporting event, from various sources. The received data may then need to be added to a database system, written to files, and/or propagated to servers. Clients may then need to ask for new data, whereupon the data may be read from the servers and provided to the requesting clients. In practice, this may cause latency or a delay from the time the data is received by the live event data content provider to when the client receives the data. In some cases, this delay may be on the order of seconds (e.g., 30 to 45 seconds) or minutes. The embodiments discussed herein may reduce that delay to an order of milliseconds (ms) (e.g., 100 ms) or less, providing a significant advantage over the conventional practices.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or system for performing these operations. This apparatus may be specially constructed for the specified purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100 for broadcasting live data in real-time. In one embodiment, the system 100 may comprise a computer-implemented system 100 having various elements, such as a client devices 110-1 through 110-a, where a represents a positive integer, a message queue server 120, and a live data access server 130. The elements may be communicatively coupled via a one or more networks (not shown). Although the system 100 shown in FIG. 1 has a limited number of elements in a certain topology, it may be appreciated that the system 100 may include more or fewer elements in alternate topologies as desired for a given implementation.

The system 100 may include a message queue server 120. Message queue server 120 may comprise one or more electronic devices capable of receiving, processing, and sending information for the system 100. Examples of an electronic device may include, without limitation, an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

Message queue server 120 may receive live data from one or more live data sources 140, and may process live data to provide live data quickly to the client devices 110-1 through 110-a (collectively client devices 110). In some embodiments, message queue server 120 is not accessible to clients over the network directly. For example, message queue server 120 may be behind a firewall (not shown). Embodiments and operations of message queue server 120 are discussed below with respect to FIGS. 3 and 4.

Live data sources 140 may include data feeds, generated by computing devices associated with a live event, monitored by the message queue server 120. Live data sources 140 may also include data gathered by human observers of a live event and entered into an interface that communicates the gathered data to message queue server 120 as live data.

The system 100 may include a live data access server 130. Live data access server 130 may include any electronic device as described above. Live data access server 130 may provide a public interface between client devices 110 and message queue server 120. For example, live data access server 130 may allow operators 108 of client devices 110 to select topics related to a live event to subscribe to, and may retrieve the topic information and push the information to the client devices 110. Embodiments and functions of live data access server 130 are discussed below with respect to FIG. 5. In an embodiment, message queue server 120 and live data access server 130 may be owned and/or under the control of the same content provider entity, such as CBS SPORTS INC., owned by CBS INTERACTIVE INC., San Francisco, Calif.

The system 100 may comprise a client device 110. A client device, e.g. client device 110-1, may be usable by an operator, e.g. operator 108-1, to subscribe to and receive live data via live data access server 130. Client device 110 may include any electronic device as described above.

Figure 2:
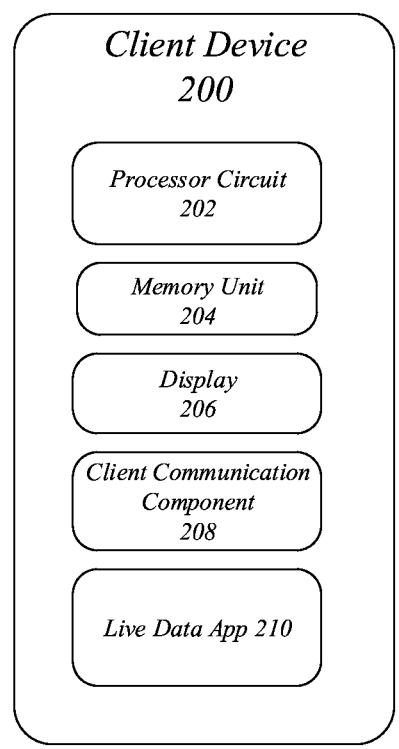
FIG. 2 illustrates an embodiment of a client device.

FIG. 2 illustrates an embodiment of a client device 200. Client device 200 may be a representative example of a client device 110. Client device 200 may execute processing operations or logic using a processor circuit 202. Processor circuit 202 may comprise various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Client device 200 may include one or more memory units 204. A memory unit 204 may include various computer-readable storage devices, volatile and non-volatile, that store data and instructions for retrieval by processor circuit 202. As used herein, a memory unit 204 does not include signals or carrier waves, such as electromagnetic or optical waves. Memory units are described further with respect to FIG. 23.

Client device 200 may include a display 206. Display 206 may be integrated into client device 200, or may be separate but communicatively coupled to client device 200. Display 206 may include a touch-sensitive surface that can detect a touch gesture or a proximity gesture, which may include contact with, or proximity to, items such as a human fingertip, a stylus, an electronic pen, and so forth. Display 206 may also include conventional computer monitors or integrated laptop computer screens.

Client 200 may include a client communication component 208. Client communication component 208 may include hardware and/or software capable of connecting to another device, e.g. live data access server 130 and communicating electronic data across the connection. In an embodiment, for example, client communication component 208 may request and participate in a websocket connection with live data access server 130. The embodiments are not limited to these examples.

Client 200 may include a live data app 210. Live data app 210 may include functions that allow an operator, e.g. operator 108-b, to open a connection with live data access server 130, request live data specific to selected topics, and view the live data on display 206 as it is received. In an embodiment, live data app 210 may be a stand-alone application executing on processor circuit 202. In another embodiment, live data app 210 may be a web browser application executing on processor circuit 202 in communication with live data access server 130.

Figure 3:
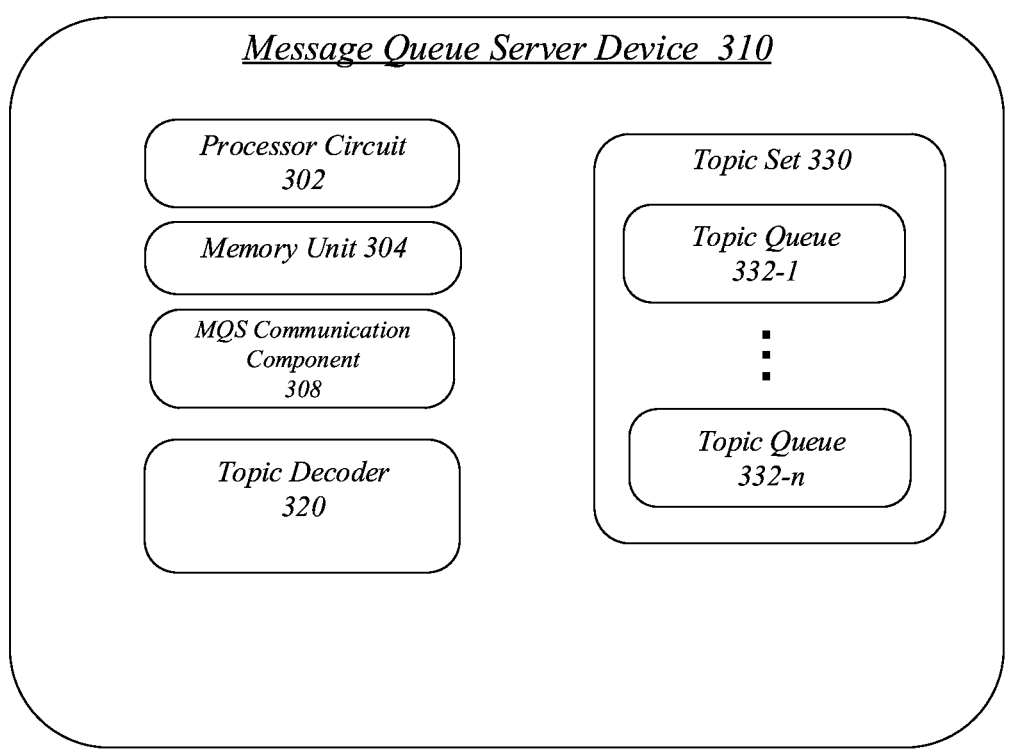
FIG. 3 illustrates an embodiment of an operating environment.

FIG. 3 illustrates an embodiment of an operating environment 300. Operating environment 300 may comprise an embodiment of a message queue server device 310. Message queue server device 310 may be a representative example of message queue server 120. Message queue server device 310 may include a processor circuit 302 and a memory unit 304, which may be analogous to processor circuit 202 and memory unit 204.

Message queue server 310 may include a message queue server (MQS) communication component 308. MQS communication component 308 may include hardware and/or software that allows MQS device 310 to transmit and receive electronic data, for example live data, with other devices, such as live data access server 130. In an embodiment, MQS communication component 308 may also receive requests to subscribe to topics in a topic set 330, and may push data from topic queues 332-1, 332-n to the subscribers of the topics corresponding to those topic queues.

MQS device 310 may include a topic decoder 320. Topic decoder 320 may include instructions that cause MQS device 310 to receive live data in the form of a topic entry, and sort the topic entry into one or more of a plurality of topic queues 332.

A topic entry may include a unit of live data received from, for example, live data sources 140 such as a live data feed or a live data entry operator. The unit of live data may include any media information about at least one of a live event (e.g., news, game, sport, activity, and so forth), an occurrence within a live event (e.g., a play, an error, an injury, a substitution, and so forth), and/or a participant at the live event (e.g., a player, a coach, an official, and so forth). A topic entry may include a topic label and a data payload including one or more items of data about a moment in a live event. The topic label may correspond to a topic queue 332. When the live event is a sporting event, such as a baseball game, the data payload may include, for example, a score, a play, an error, an injury, a player at-bat, and so forth.

Topic decoder 320 may remove the topic label from the topic entry, use the topic label to identify a topic queue 332, and may place the data payload of the topic entry into the identified topic queue. MQS communication component 308 may then push the data payload from the topic queue to a live data access server that has subscribed to the topic of the topic queue. In some embodiments, topic decoder 320 may format the data payload, or otherwise alter the structure of the data payload prior to placing the data payload into the topic queue. For example, the data payload may be inserted into an eXtensible Markup Language (XML) structure or into a Javascript Object Notation (JSON) structure. The embodiments are not limited to these examples.

In an embodiment, topic set 330 may represent the whole collection of topics that have topic queues 332 on MQS device 310. Topic set 330 may include a list or other data collection type that may be shared with, for example, a live data access server 130 so that the live data access server 130 can, in turn, share the list with clients for selection of topics of interest.

A topic queue 332 may be a queue data structure, in particular a first-in first-out queue, where data payloads are placed and immediately pushed to a subscribing live data access server. In an embodiment, the data payloads may not be stored on MQS device 310 once pushed out to the subscribing live data access server.

In some embodiments, topic queues 332 may be hierarchically related. For example, a topic "gamecenter.nfl" may apply to all data about the National Football League. A dependent topic may be "gamecenter.nfl.ravenssteelers" which may relate to a specific game between two NFL teams. A third topic may be "gamecenter.nfl.ravenssteelers.stats" which may relate to statistics about the specific game.

Figure 4:
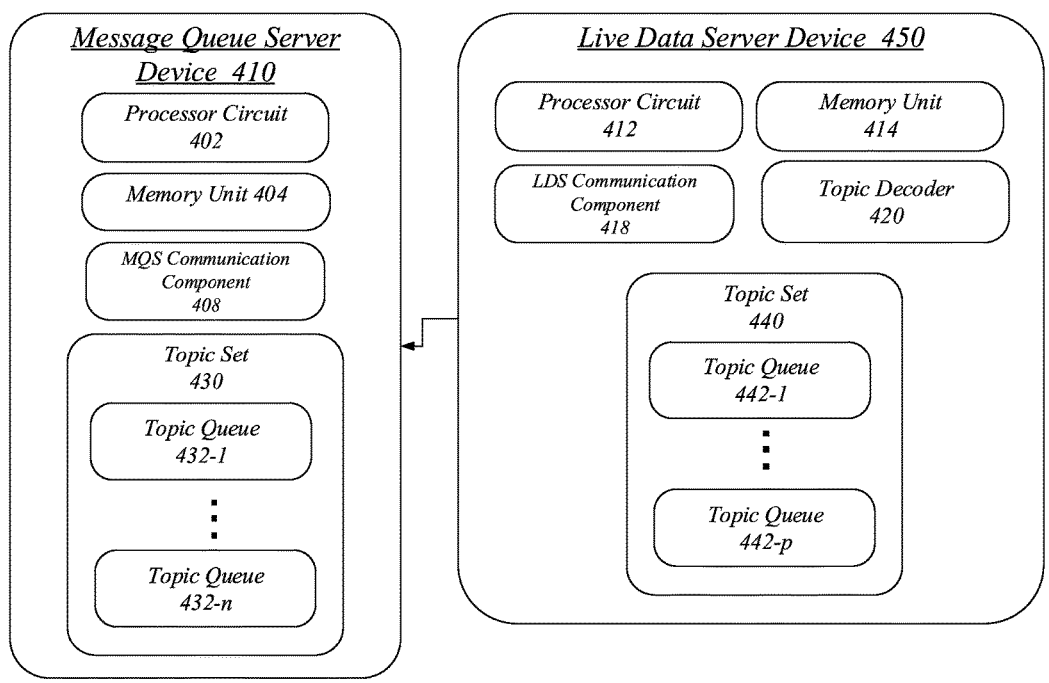
FIG. 4 illustrates an embodiment of a second operating environment.

FIG. 4 illustrates an embodiment of an operating environment 400. Operating environment 400 may illustrate a second embodiment of message queue server 120. As shown in FIG. 4, message queue server 120 may be implemented with at least two separate devices: a message queue server device 410 and a live data server device 450.

Message queue server device 410 may be substantially similar to message queue server (MQS) device 310, including a processor circuit 402, memory unit 404, and a MQS communication component 408, which may be analogous, respectively, to processor circuit 302, memory unit 304 and MQS communication component 308. MQS device 410 may also include a topic set 430 and topic queues 432, analogous to topic set 330 and topic queues 332, respectively.

Live data server device 450 may be a separate computing device from MQS device 410, and may have its own processor circuit 412 and memory unit 414. Live data server device 450 may also include a live data server (LDS) communication component 418. LDS communication component 418 may include hardware and/or software that allows live data server device 450 to receive live data and transmit the data payloads to MQS device 410.

Live data server device 450 may include topic decoder 420, which may operate analogously to topic decoder 320. Live data server device 450 may have its own topic set 440 and topic queues 442. In an embodiment, topic set 440 may include the same topic queues 442 as topic set 430 of MQS device 410. In another embodiment, topic set 440 may also include other topic queues 442 that are not in topic set 430. Topic set 430 may also include topic queues 432 that are not in topic set 440 of live data server device 450.

Implementing a message queue server as two separate devices may be useful to protect proprietary data that may be stored on live data server device 450 and/or to limit potentially harmful access to the live data server device.

In an embodiment, message queue server device 410 may be implemented as a RABBITMQ™ server. RABBITMQ™ is open source message broker software provided by Pivotal Software, Inc. RABBITMQ™ facilitates topic queues that receive published messages and push the messages to clients that have subscribed to the topic queues. The embodiments are not limited to this implementation.

Figure 5:
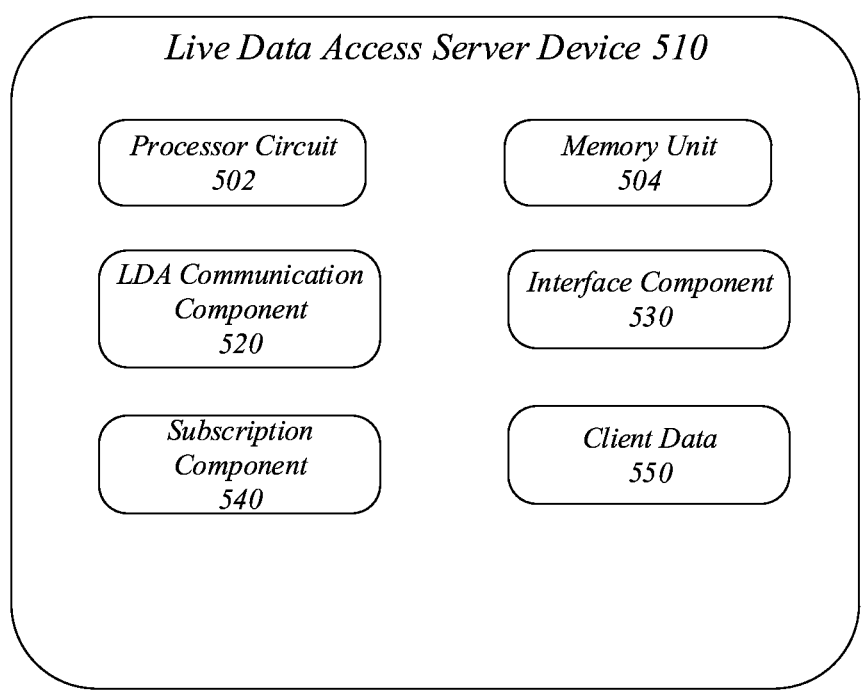
FIG. 5 illustrates a second embodiment of a third operating environment.

FIG. 5 illustrates an embodiment of an operating environment 500. Operating environment 500 may comprise a live data access server 510, which may be a representative example of live data access server 130. Live data access server 510 may include a processor circuit 502 and a memory unit 504, analogous to processor circuit 202 and memory unit 204.

Live data access server 510 may include one or more functional components, for example, a live data access (LDA) communication component 520, an interface component 530, and a subscription component 540. Additional or other components may also be used.

LDA communication component 520 may include hardware and/or software that allows live data access server 510 to open and maintain connections with, for example, client devices 110 and message queue server 120. In an embodiment, LDA communication component 520 may be able to listen for, accept, or otherwise open, and maintain a full-duplex connection, such as a websocket connection with a client device 110. A websocket connection typically comprises a two-way connection between two entities, where each of the two entities can send and receive data simultaneously, analogously to a voice telephone connection where both parties can talk and listen at the same time. Alternatively, half-duplex connections may be utilized as well. The embodiments are not limited to these examples.

LDA communication component 520 may also operate to receive connection requests from client devices 110 and to authenticate the requesting client. In some embodiments, operators 108 may need to register with live data access server 510 in order to be able to subscribe to and receive the live data. Client data 550 may include registration information, including, but not limited to, user identifiers, user names, passwords, and payment information. In some embodiments, a failure to authenticate a client may result in the connection being denied.

Live data access server 510 may include an interface component 530. Interface component 530 may provide user interface elements or supporting data for a client-side user interface. Interface 530 may generally provide an interface to allow an operator to request and authenticate a connection to live data access server 510, to select one or more topics relating to live events for subscription, and to receive and display the live data as it is received by message queue server 120. Examples of user interfaces are discussed with respect to FIGS. 8-10.

Subscription component 540 may manage subscriptions to topics for currently connected clients. For example, subscription component 540 may receive the selected topic(s) from interface component 530 for a particular connected client. Subscription component 540 may then communicate with message queue server 120 to subscribe to the topic queues that correspond to the selected topics. In some embodiments, client data 550 may also store topic preferences for a registered operator, for example, favorite topics, favorite teams, players, event types, and so forth.

Figure 6:
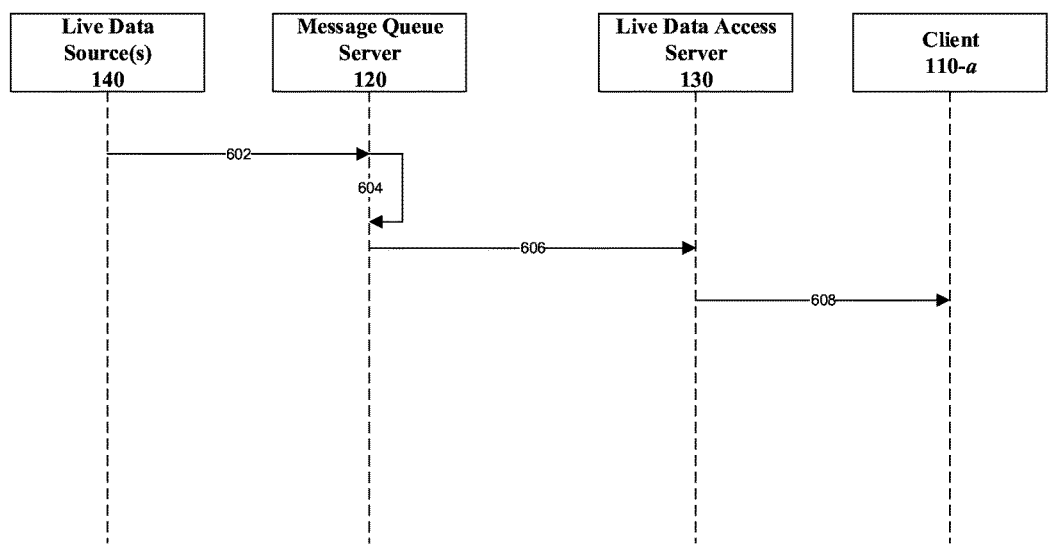
FIG. 6 illustrates an embodiment of a message flow.

FIG. 6 illustrates an embodiment of a message flow 600. Message flow 600 may represent messages communicated among the components of system 100. In particular, message flow 600 may occur among one or more live data sources 140, message queue server 120, live data access server 130, and a client device 110-*a*. In message flow 600, time flows from the top of the diagram toward the bottom. Message flow 600 may represent messages communicated while live data is generated and collected during a live event, and broadcasted to one or more client devices 110-*a*. In some cases, the client devices 110-*a* and/or users of the client devices 110-*a* may enroll in a subscription to a live data service provider implementing the lived data access server 130. Of note is that the message flow 600 assumes that client device 110-*a* has already established an open connection with live data access server 130 and has selected at least one topic to subscribe to, and that live data access server 130 has already subscribed to the at least one selected topic at the message queue server 120.

Message flow 600 begins when live data is received from live data source(s) 140 at message queue server 120 in message 602. Message 602 may be in the form of a topic entry, which may include, at least, a topic label and a data payload. A topic label may be, for example and without limitation, a text string such as "gamecenter.nfl.ravenssteelers," which in this example identifies a content provider, a league, and a specific live event. A data payload may include one or more items of information about the live event in progress, such as a score, a name of the player that scored or made a play, an injury, a penalty, an error, a new record set, and so forth.

Message queue server 120, upon receiving message 602, may sort the data payload of message 602 into a topic queue, such as topic queue 332-1 or 442-1, according to the topic label, in message 604. In some embodiments, message queue server 120, e.g. using topic decoder 320, may format the data payload or otherwise alter the structure of the data payload. For example, the data payload may be inserted into an eXtensible Markup Language (XML) structure or into a Javascript Object Notation (JSON) structure. The embodiments are not limited to these implementations.

Once the data payload is inserted into a topic queue, message queue server 120 may push the data payload to live data access server 130 in message 606. Again, this assumes that live data access server 130 has subscribed to the topic queue selected in message 604.

Upon receipt of message 606, live data access server 130 may push the data payload to client device 110-*a* in message 608, assuming both that client device 110-*a* selected the topic corresponding to the topic queue of message 604 and that the connection between client device 110-*a* and live data access server 130 is still open.

Of note is that the elapsed time between the receipt of message 602 by message queue server 120 and the receipt of message 608 by client device 110-*a* may be on the order of, for example, 900 milliseconds, or less.

Figure 7:
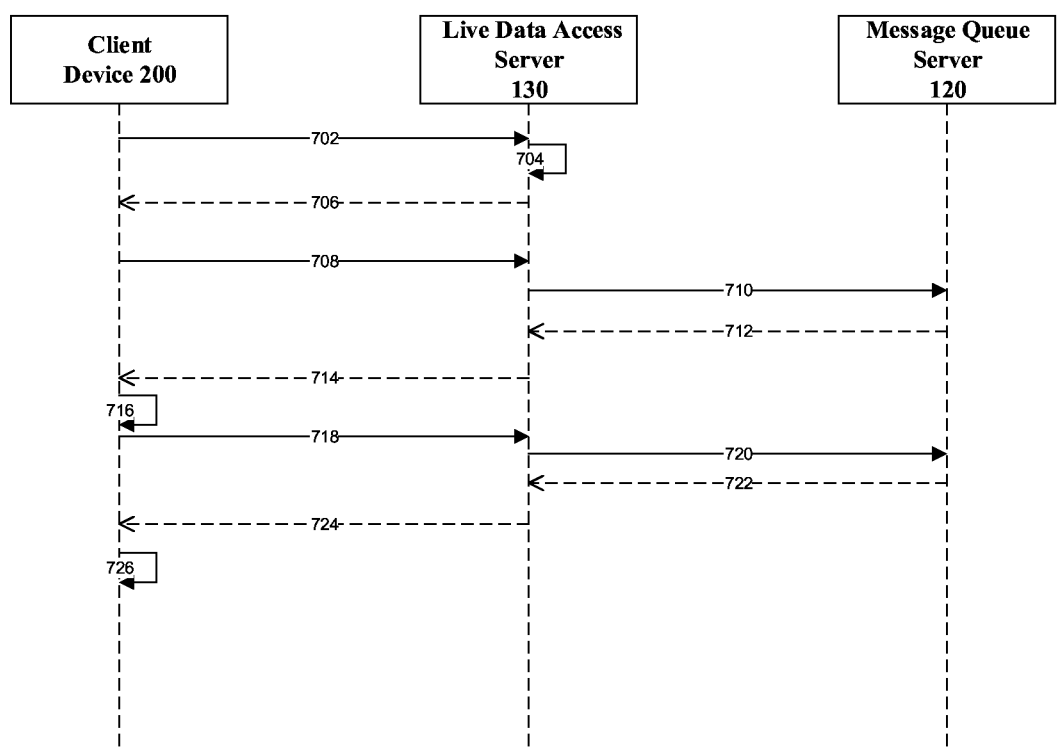
FIG. 7 illustrates an embodiment of a second message flow.

FIG. 7 illustrates an embodiment of a message flow 700. Message flow 700 may represent messages communicated among the components of system 100. In particular, message flow 700 may occur among a client device 200, message queue server 120, and live data access server 130. In message flow 700, time flows from the top of the diagram toward the bottom. Message flow 700 may represent messages communicated as a client connects, subscribes to, and receives live data.

Message flow 700 begins when client device 200 requests a connection to live data access server 130 with message 702. Message 702 may be issued, for example, from a user interface element in live data app 210 selected by an operator 108, or automatically when live data app 210 is opened or launched on client device 200. In an embodiment, message 702 may include authentication information for the operator 108, for example, a user name and password.

Live data access server 130 may authenticate the client at message 704. For example, live data access server 130 may compare the authentication information to the information in client data 550. If the client device 200 does not have any information in client data 550, the client operator may be prompted to create an account as part of the authentication (not shown).

If the authentication succeeds, then a connection between client device 200 and live data access server 130 may be opened or accepted via message 706. The connection, for example, may be a full-duplex connection, such as a websocket connection.

In an embodiment, client device 200 may optionally request a topic list from live data access server 210 in message 708. For example, the live data app 210 may request the topic list in order to be able to display a selection user interface element to allow the operator to select one or more topics to subscribe to.

In response to optional message 708, live data access server 130 may request or look up a topic list from message queue server 120 in message 710. Message queue server 120 may provide, for example, topic set 330 as a response in message 712. Live data access server 130 may then provide the topic list to client device 200 in message 714.

The operator of client device 200 may select, in message 716, one or more topics from the topic list and client device 200 may then send the selected topic(s) to live data access server 130 in message 718. The topic list may, for example, be displayed in a graphical user interface element, displayed as text, or otherwise made viewable to the operator 108. The operator may select the topics using user interface elements, such as check boxes, radio buttons and so forth, or may enter the topics as text, for example, from a keyboard or touch interface.

In response to receiving the selected topic(s) in message 718, live data access server 130 may then subscribe to the selected topic(s) with message 720 to message queue server 120. Subscribing to a topic may include registering with message queue server 120 that live data access server 130 is to receive any data payload placed in a topic queue for that topic.

Message flow 700 may continue when message queue server 120 receives a data payload in the subscribed-to topic queue (not shown), as discussed with respect to message flow 600. Message queue server 130 may push the data payload to live data access server 130 in message 722. Live data access server 130 may then push the data payload to client device 200 in message 724.

Upon receiving message 724, client device 200 may parse the data payload and present the live data in message 726. For example, live data app 210 may parse an XML or JSON data payload and present the live data in a user interface element so that the data is human-readable. In some embodiments, the data payloads may contain some elements of old data or data unchanged from the data received in a previous data payload. For example, the more recent data payload may include an unchanged score, but also include data about a new play, or player substitution. In some embodiments, data that is unchanged from a previous data payload may stripped from the data presented to the operator so that only new information is presented. The embodiments are not limited to these examples.

Figure 8:
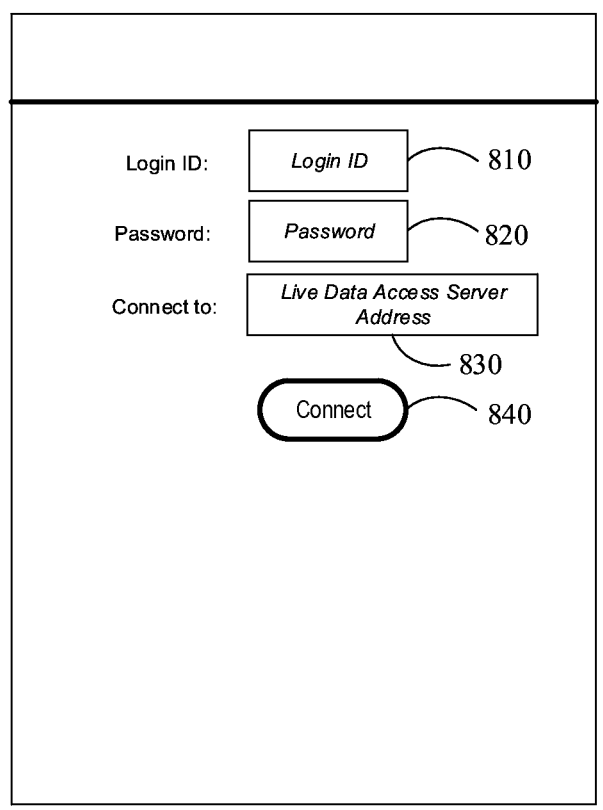
FIG. 8 illustrates an embodiment of a user interface.

FIG. 8 illustrates an embodiment of a user interface (UI) 800. UI 800 may be presented by live data app 210. UI 800 may include various UI elements that allow an operator 108 of a client device 110 to request a live data connection with a live data access server. For example, and without limitation, UI 800 may include a login ID UI element 810 and a password UI element 820 to allow the operator to enter, respectively, an identifier, such as a user name, email address, and so forth, and a password or other authentication means.

UI 800 may also include an address UI element 830 to allow the operator to select or enter the address or connection information to a particular live data access server. The address may resemble a uniform resource locator (URL), for example, "torq.cbssports.com/torq." In an embodiment, address UI element 830 may be a text field or a pull-down menu pre-populated with addresses of live data access servers available to live data app 210. The embodiments are not limited to these examples.

UI 800 may further include a connect UI element 840, that when selected, causes live data app 210 to send the entered login ID and password to the entered or selected address to request a connection.

Figure 9:
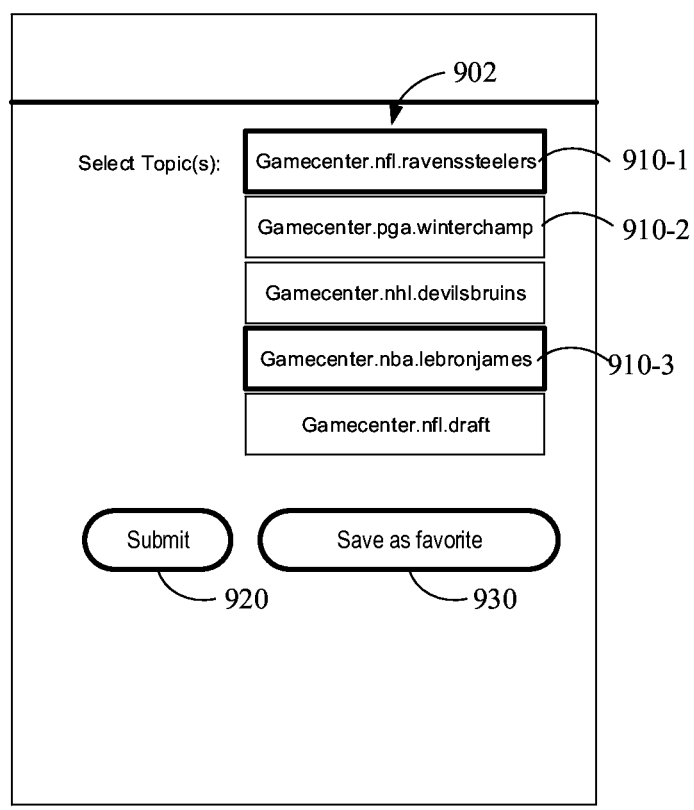
FIG. 9 illustrates an embodiment of a second user interface.

FIG. 9 illustrates an embodiment of a user interface (UI) 900. UI 900 may be presented by live data app 210. UI 900 may include various UI elements that allow an operator 108 of a client device 110 to view and select topics of live data to subscribe to. For example, and without limitation, UI 900 may list the topics available from a message queue server in a topic selection list 902. Topic selection list 902 may be, for example, a drop-down or pop-up menu, a list of selectable buttons, a text list having selectable buttons corresponding to the topic text, and so forth. The embodiments are not limited to these examples.

As shown in UI 900, topic list 902 shows five possible topics for selection, including topic 910-1 corresponding to a National Football League (NFL) game between the Baltimore Ravens and the Pittsburgh Steelers. Topic 910-2 corresponds to a Professional Golf Association event for their winter championship. Topic 910-3 corresponds to a National Basketball Association topic about player LeBron James. The embodiments are not limited to these examples.

UI 900 may change the visual representation of a topic when it is selected. For example, topics 910-1 and 910-3 have darker bolder lines surrounding them to indicate that they have been selected. Other methods of visually indicating a selection are also possible, including but not limited to, bolding text, changing a background color, changing a text color, checking a check box, and so forth.

UI 900 may provide a submit button 920 that when selected by the operator causes the live data app 210 to send the selected topic(s) to live data access server 130. UI 900 may also provide a save button 930 that when selected by the operator causes the live data app 210 to indicate to live data access server 130 that the selections of topics can be saved to client data 550. Having saved favorites may allow live data access server 130 to subscribe automatically to the saved topics whenever a connection is opened with that client. Saved favorite information may also be used for marketing and advertising purposes to customize ads shown to that operator on that client. The embodiments are not limited to these examples.

Figure 10:
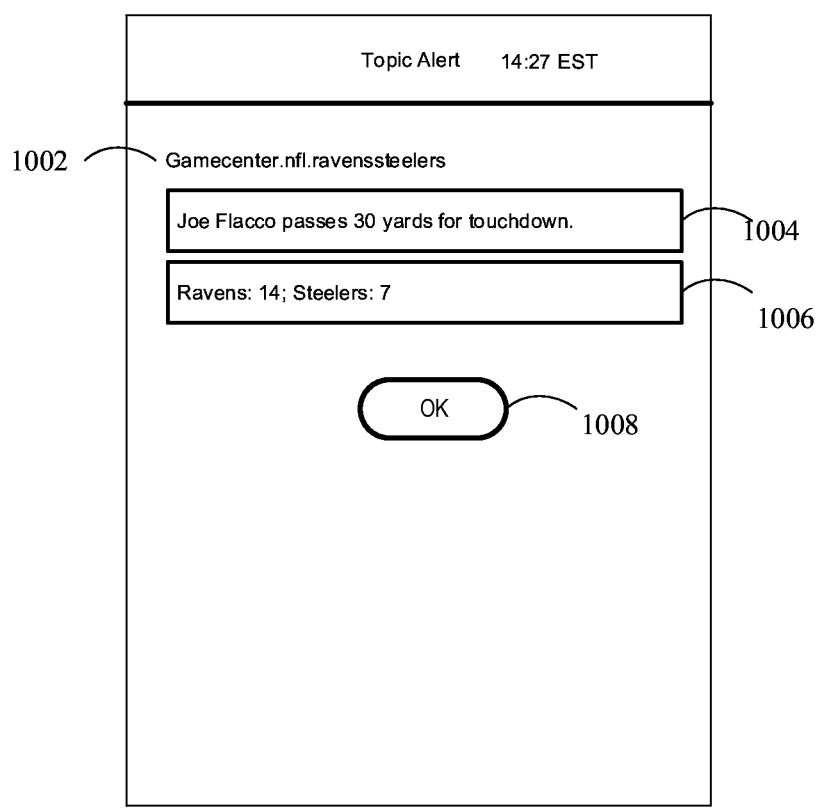
FIG. 10 illustrates an embodiment of a third user interface.

FIG. 10 illustrates an embodiment of a user interface (UI) 1000. UI 1000 may be presented by live data app 210. UI 1000 may be one example of a display of a received live data payload. UI 1000 may appear as a full screen alert brought to the foreground of any other running applications on client device 110. UI 1000 may indicate the topic 1002 that generated the data. The data from the payload may be presented, for example, as lines of text, such as text 1004 and text 1006. In some embodiments, the live data app 210 may only display new data, and may omit unchanged data. For example, if instead of a touchdown, text 1004 were about a 30 yard pass, and the score was unchanged, then text 1006 might not be displayed. UI 1000 may include an OK button 1008 to allow the operator to dismiss the displayed live data.

Received live data may be displayed in other ways without departing from the intent of the embodiments. For example, instead of a full-screen alert, the live data may be displayed in a smaller area at the top or bottom of the client device display and may be removed from the screen after a delay absent action from the operator. The live data could be received as a text message or other instant message format. The embodiments are not limited to these examples.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
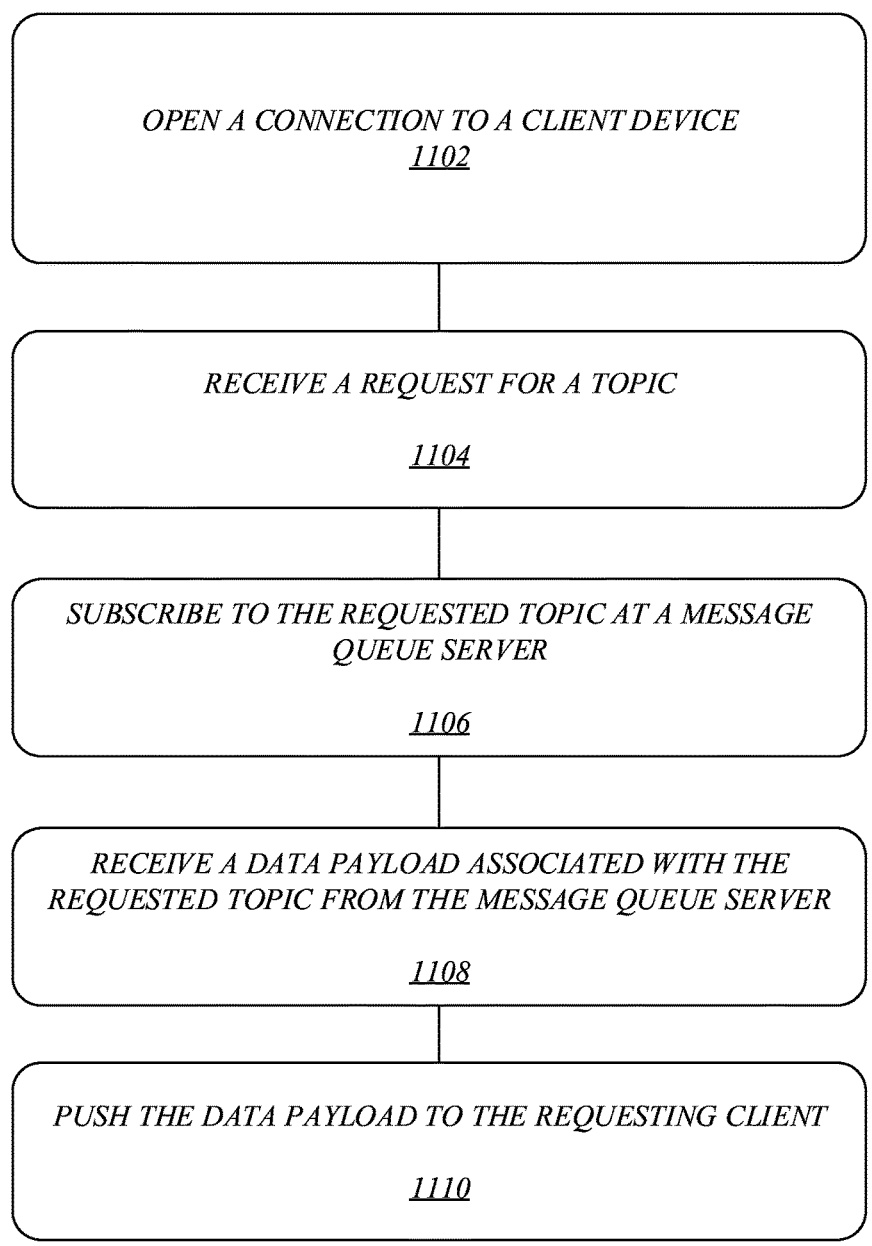
FIG. 11 illustrates a logic flow for the system of FIG. 1.

FIG. 11 illustrates a logic flow 1100. The logic flow 1100 may be representative of some or all of the operations executed by one or more embodiments described herein. In particular, the logic flow 1100 may represent the operations executed by a live data access server, e.g. live data access server 130, 510.

In the illustrated embodiment shown in FIG. 11, the logic flow 1100 may open a connection with a client device at block 1102. For example, live data access server 130 may receive a request from client device 110. The request may include a user identifier such as a login ID or username, and a password or other authentication means. The live data access server may open or accept a connection to the client such that the client and the live data access server can send and receive data to each other simultaneously. The connection may be a websocket connection.

The logic flow 1100 may receive a request for a topic from the client device at block 1104. For example, the client device 110 may send one or more topics, which an operator has selected to follow, to live data access server 130. In an embodiment, the topics may be selected from a topic set provided to the client device 110 by the live data access server 130.

The logic flow 1100 may subscribe to the requested topic at a message queue server at block 1106. For example, live data access server 130 may subscribe to the requested topic at a message queue server 120. Subscribing may include, for example, registering with message queue server 120 to receive any data for the requested topic, or providing an address or connection to message queue server 120 to receive any data for the requested topic. The embodiments are not limited to these examples.

The logic flow 1100 may receive a data payload of a topic entry associated with the requested topic from the message queue server at block 1108. For example, live data access server 130 may receive a data payload from message queue server 120.

The logic flow 1100 may push the data payload of the topic entry to the client device via the connection at block 1110. For example, live data access server 130 may push the data payload to client device 110, and to any other connected client devices that also requested that topic. In various embodiments, the data payload of the topic entry may be pushed to the subscribed connected client devices substantially simultaneously with the message queue server receiving the topic entry from a live data source, e.g. with a time delay of 100 milliseconds or less. In the embodiments described herein, a set of actions described as taking place "substantially simultaneously" means that the set of actions execute within the same defined period of time. The defined period of time may be of any length as suitable for a given implementation. In one embodiment, for example, the defined period of time is at least two orders of magnitude shorter than conventional time periods of legacy devices. For example, conventional time periods for legacy devices may be on the order of 30 to 45 seconds. The set of actions may be executed sequentially, in parallel, or some combination thereof within the defined time period.

FIG. 12 illustrates a logic flow 1200. The logic flow 1200 may be representative of some or all of the operations executed by one or more embodiments described herein. In particular, the logic flow 1200 may represent the operations executed by message queue server 120.

In the illustrated embodiment shown in FIG. 12, the logic flow 1200 may receive a topic entry from a live data source at block 1202. For example, message queue server 120 may receive a topic entry having a topic label and a data payload from a live data source 140. The topic entry data payload may include data received from live data feeds and/or topic entry operators. The live data may be about a live event in progress, such as a sporting event, breaking news, a professional sports draft, a tournament, and so forth.

The logic flow 1200 may sort the topic entry into one or more of a plurality of topic queues at block 1204. For example, message queue server 120 may determine what topic the topic entry pertains to and may place at least the data payload into a topic queue 332 for that topic.

The logic flow 1200 may push a data payload of a topic entry from a topic queue to a live data access server that has subscribed to the topic of the topic queue at block 1206. For example, message queue server 120 may push the data payload from a topic queue to any live data access server 130 that has subscribed to the topic of a topic queue 332.

In various embodiments, blocks 1202, 1204 and 1206 may take place sequentially within a defined time period, e.g. within an elapsed time of 200 milliseconds or less.

Figure 13:
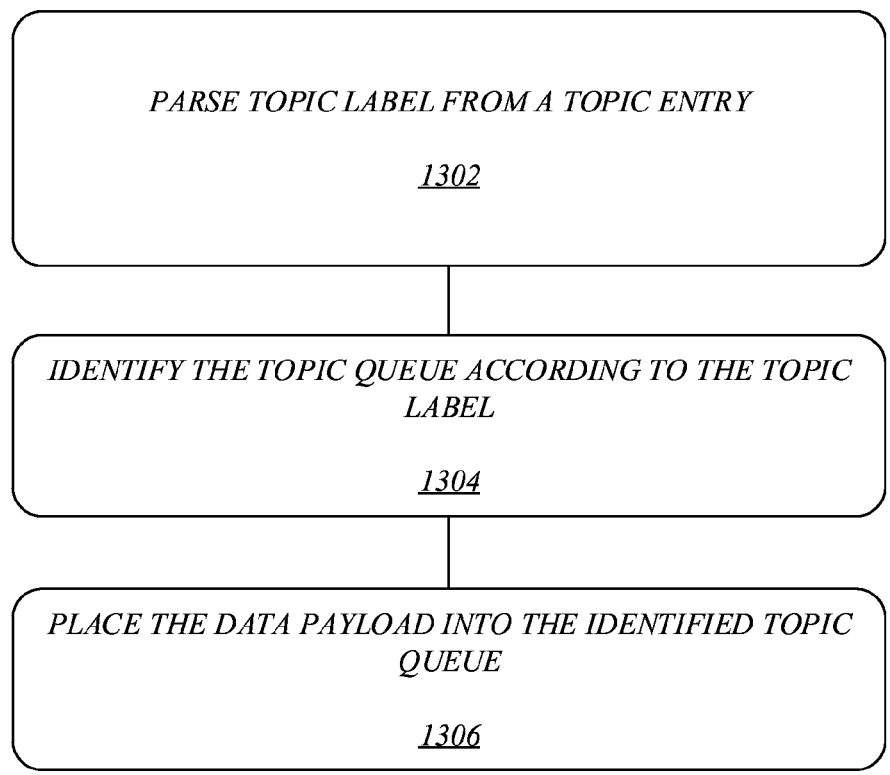
FIG. 13 illustrates a third logic flow for the system of FIG. 1.

FIG. 13 illustrates a logic flow for the system of FIG. 1. The logic flow 1300 may be representative of some or all of the operations executed by one or more embodiments described herein. In particular, the logic flow 1300 may represent the operations corresponding to block 1204 of logic flow 1200, and executed by topic decoder 320, 420.

In the illustrated embodiment, shown in FIG. 13, the logic flow 1300 may parse the topic label from the topic entry at block 1302. For example, the topic entry may include a topic label that identifies the topic of the received data. The topic label may be in a variety of forms. For example, the topic label may be in a known section of an XML structured topic entry, or may be in a known position of a comma-delimited (or tab, space, semi-colon delimited) text string, and so forth. The topic decoder 320, 420 may know where to look for the topic in the topic entry and may include instructions for extracting the topic label from the topic entry.

The logic flow 1300 may identify a topic queue according to the topic label at block 1304. For example, topic decoder 320, 420 may compare the topic label to the topics in topic set 330, 440, or directly to the names of the topic queues 332, 442 to identify at least one topic queue corresponding to the topic of the topic entry. In an embodiment where topic queues are hierarchically related, topic decoder 320, 420 may place a copy of a data payload in multiple topic queues. For example, if the topic entry topic label is "gamecenter.nfl.ravenssteelers.statistics" as in an earlier example, the data payload may be placed in each of the topic queues: gamecenter.nfl, and gamecenter.nfl.ravenssteelers, and gamecenter.nfl.ravenssteelers.statistics. If there were a fourth topic queue "gamecenter.nfl.ravenssteelers.plays", i.e. a topic at the same hierarchical level as gamecenter.nfl.ravenssteelers.statistics, the data payload for gamecenter.nfl.ravenssteelers.statistics would not be placed in this fourth topic queue. In other embodiments, topic decoder 320, 420 may place the data payload only in the topic queue exactly matching the topic label.

The logic flow 1300 may place the data payload of the topic entry into the identified topic queue at block 1306. For example, topic decoder 320, 420 may write the data payload into a first-in first-out topic queue, such as topic queue 332 or 442.

In some embodiments, a live event may have many topics associated with it. For example, a tournament or player draft event may have topics for the multiple games, or draft rounds, as well as for players, teams, and so forth. Subscribing to each individual topic may overwhelm the operator with information, and may negatively affect processing resources on a client device. Additionally, system 100 may be vulnerable to losing data if, for example, the live data server device 450 becomes unavailable and stops placing data payloads into topic queues.

Figure 14:
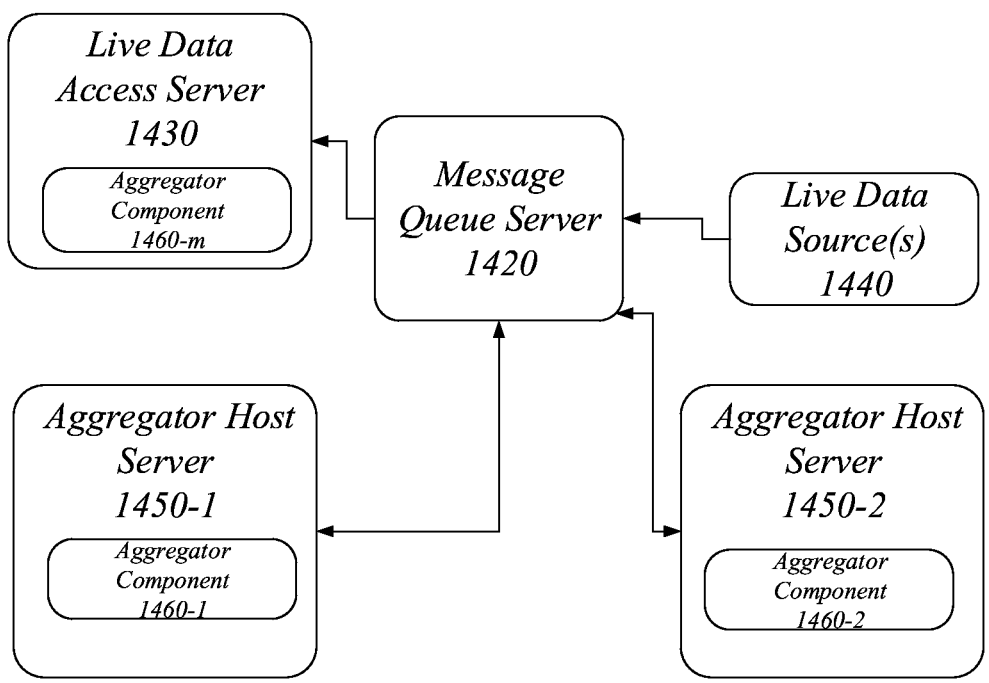
FIG. 14 illustrates an embodiment of a second system for aggregating and broadcasting real-time data.

Accordingly, FIG. 14 illustrates a system 1400 for aggregating multiple topics and for providing scalable redundancy so that no live data is lost. System 1400 may include some or all of the components of system 100. For example, system 1400 may include a message queue server 1420, a live data access server 1430, and live data source(s) 1440, which may be embodiments of message queue server 120, live data access server 130, and live data source(s) 140, respectively. Client devices 110 are not shown for brevity. Although the system 1400 shown in FIG. 14 has a limited number of elements in a certain topology, it may be appreciated that the system 100 may include more or fewer elements in alternate topologies as desired for a given implementation.

In addition to the components of system 100, system 1400 may include a plurality of aggregator components, such as aggregator components 1460-1, 1460-2 . . . 1460-m, where m is a positive integer, executing on a plurality of aggregator host servers, such as aggregator host servers 1450-1, 1450-2 . . . 1450-m. In an embodiment, live data access server 1430 may act as an aggregator host server. An aggregator component 1460 may simultaneously subscribe to a plurality of topics associated with one live event at message queue server 1420 and may consolidate the data from the plurality of topics into an aggregated topic entry which the aggregator component 1460 may then publish to message queue server 1420 so that client devices 110, via live data access server 1430, can subscribe to the aggregated topic. In an embodiments, the aggregated topic may be created by an operator of the content provider entity for use by subscribing operators. In some embodiments, subscribing operators may be permitted to suggest or create their own aggregated topics.

In an embodiment, each of the aggregator components 1460-1, 140-2, . . . 1460-m, may subscribe to the same plurality of topics and may consolidate the data into identical aggregated topic entries. However, only one of the aggregator components 1460, e.g. aggregator component 1460-1, may have a publisher role, where the remaining aggregator components 1460 may have worker roles. Only the aggregator component 1460 with the publisher role may publish the aggregated topic entry to message queue server 1420. The worker aggregator components 1460 may temporarily store their respective copies of the aggregated topic entry. The temporarily stored copies from one aggregator components may be published to the message queue server in the event that the publisher aggregator component become unavailable, as will be described below.

Figure 15:
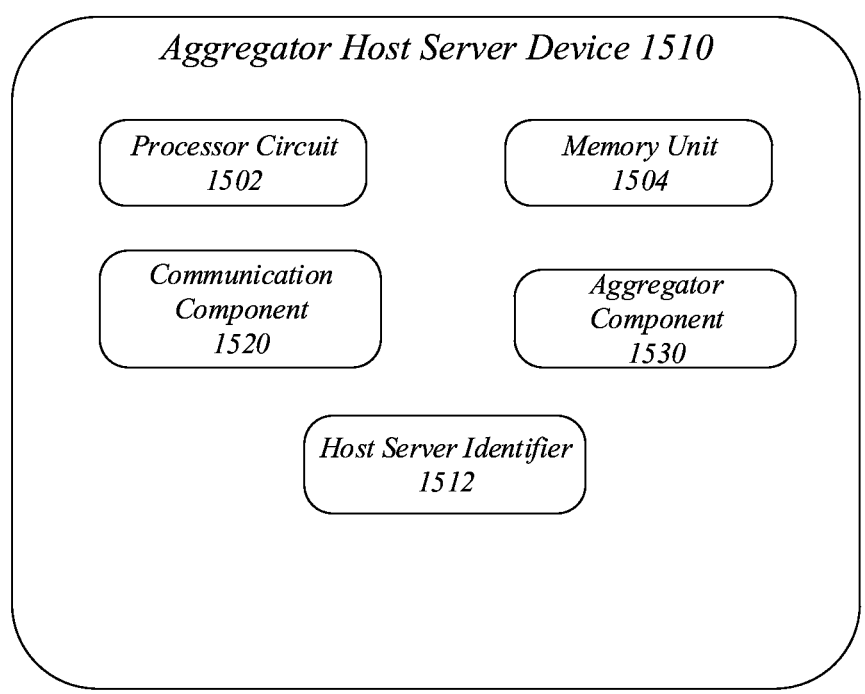
FIG. 15 illustrates an embodiment of a fourth operating environment.

FIG. 15 illustrates an embodiment of an operating environment 1500. Operating environment 1500 may comprise an embodiment of an aggregator host server device 1510. Aggregator host server device 1510 may be a representative example of an aggregator host server such as aggregator host server 1450-1, or 1450-2. An aggregator host server device 1510 may be a computing device as described above, and may include various hardware components such as a processor circuit 1502 and a memory unit 1504, which may be analogous to processor circuit 202 and memory unit 204.

Aggregator host server device 1510 may include various functional components, such as, but not limited to a communication component 1520, and an aggregator component 1530, which may be a representative embodiment of an aggregator component 1460. Aggregator host server device 1510 may also have a host server identifier 1512, which may be stored on memory unit 1504 or elsewhere within the elements of a computing device. Host server identifier 1512 may uniquely identify the aggregator host server device 1510 to the other aggregator host servers of system 1400.

Communication component 1520 may be hardware and/or software that allows aggregator host server 1520 to connect and exchange information with, for example, message queue server 1420.

Aggregator host component 1530 may include instructions that when executed on processor circuit 1502, cause aggregator host server device 1510 to subscribe to a plurality of topics associated with a live event at message queue server 1420; receive a plurality of data payloads of topic entries associated with the subscribed topics from message queue server 1420 from the subscribed topics; and aggregate the plurality of data payloads into a new aggregated topic entry. When aggregator component 1530 has the publisher role, aggregator component 1530 may publish the new aggregated topic entry to an aggregated topic back to the message queue server.

While the aggregator host server device 1510 is shown with a specific number and arrangement of elements, more, fewer, or other elements may also be used to perform the functions described herein.

Figure 16:
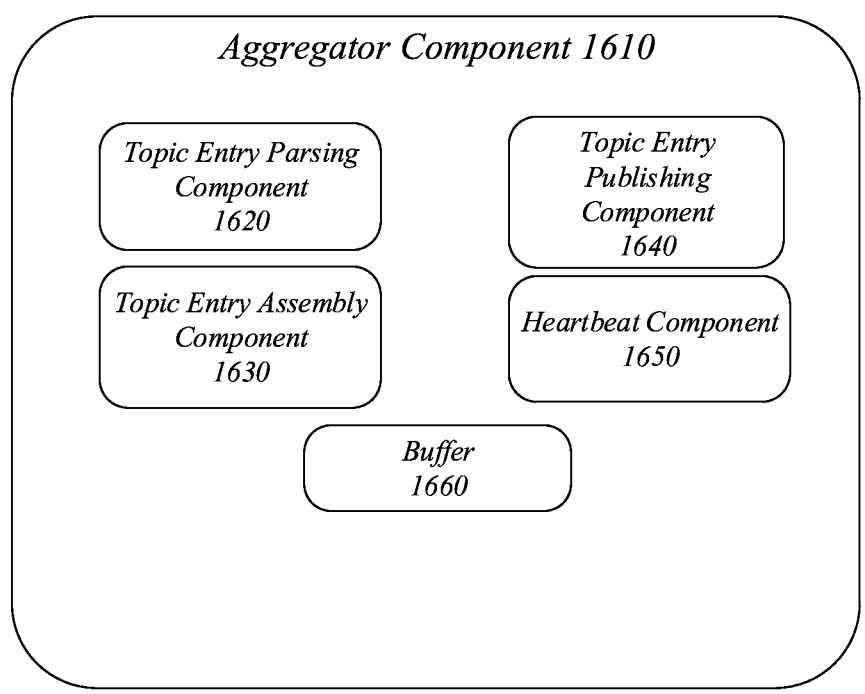
FIG. 16 illustrates an embodiment of a fifth operating environment.

FIG. 16 illustrates an embodiment of an operating environment 1600. Operating environment 1600 may comprise an embodiment of an aggregator component 1610. Aggregator component 1610 may be a representative example of an aggregator component such as aggregator component 1460-1, 1460-2, or 1530.

Aggregator component 1610 may include various functional components such as, but not limited to, a topic entry parsing component 1620, a topic entry assembly component 1630, a topic entry publishing component 1640 and a heartbeat component 1650. Aggregator component 1610 may also have a buffer 1660, which may use a portion of memory unit 1504. Aggregator component 1610 may include more, fewer, or a different set of functional components to perform the operations discussed herein.

Topic entry parsing component 1620 may include instructions for receiving a plurality of data payloads from a plurality of topic queues. Topic entry parsing component 1620 may extract data from the data payloads. When a data payload includes multiple data units, e.g., a score, a player name, a play, and so forth, topic entry parsing component 1620 may separate each data payload into individual data units.

Topic entry parsing component 1620 may then determine whether any of the parsed data is new. For example, for each data payload received within a time window, e.g. the last five seconds, topic entry parsing component 1620 may compare the received data payload for a topic to an earlier received data payload for the topic to identify changed data. Alternatively, each data payload may be compared to a previous data payload for the same topic to determine whether any data has changed, regardless of when the topic entry was received.

Topic entry assembly component 1630 may include instructions for receiving the parsed data from topic entry parsing component 1620 and may assemble the parsed data from the plurality of topics into one, new aggregated topic entry. In an embodiment, unchanged data may be discarded, while new, or updated, data may be placed into the new aggregated topic entry. The new aggregated topic entry may include a topic label, e.g. "gamecenter.nfl.draft". In some embodiments, each new aggregated topic entry may also have a sequence number, where each new aggregated topic entry's sequence number is greater, e.g. by one, than the sequence number of the aggregated topic entry assembled previously.

Topic entry publishing component 1640 may receive the new aggregated topic entry from topic entry assembly component 1630 and may publish the new aggregated topic entry to message queue server 1420. Publishing may include, for example, providing the data payload of the new topic entry to message queue server 1420 for placement in the topic queue for the aggregated topic. Publishing may alternatively include placing the new aggregated topic entry directly into the topic queue on message queue server 1420. In some embodiments, topic entry assembly component 1630 and topic entry publishing component 1640 may be combined into one functional component. In some embodiments, publishing may bypass the use of a topic decoder, e.g. topic decoder 320, 420, by placing the data payload of the new aggregated topic entry directly into the topic queue for the aggregated topic. The embodiments are not limited to these examples.

Heartbeat component 1650 may publish a heartbeat topic entry to message queue server 1420. A heartbeat topic entry may include, at least the host server identifier 1512 for the aggregator server host 1510 of aggregator component 1610. The heartbeat topic entry may optionally include other information, such as a time stamp and/or a role indication, e.g., "publisher" or "worker". The heartbeat topic entry may indicate to other aggregator components that aggregator component 1610 is still connected to the communication network and still operational.

Heartbeat component 1650 may also subscribe to heartbeat topics published by the other aggregator components. When heartbeat topic entries of the other aggregator components 1460 are received from message queue server 1420, heartbeat component 1650 may determine, based on the received heartbeat topic entries, that the aggregator component having the publisher role is unavailable. For example, the heartbeat entry for the publisher may be missing for a specified time period during which a plurality of topic entries were received for aggregation.

Heartbeat component 1650 may determine whether aggregator component 1610 is next in line to become the publisher, and if so, may change from the worker role to the publisher role. Heartbeat component 1650 may, for example, sort the host server identifiers, and compare its host server identifier 1512 to the host server identifier next in order after the host server identifier of the missing publishing aggregator component. The embodiments are not limited to these examples.

Buffer 1660 may be used to store the aggregated topic entries when aggregator component 1610 has a worker role. In the event that aggregator component 1610 assumes the publisher role, topic entry publishing component 1640 may publish any aggregated topic entries in buffer 1660 that are newer than a last published aggregated topic entry to the aggregated topic at the message queue server. For example, topic entry publishing component 1640 may compare the sequence number of the last topic entry published by message queue server 1420 to the sequence number(s) of the topic entries in buffer 1660 and may publish all of the topic entries in buffer 1660 having larger sequence numbers than the last published topic entry. Alternatively, topic entry publishing component 1640 may compare a time stamp of a last published topic entry to the time stamps of the topic entries in buffer 1660 and publish all of the topic entries in buffer 1660 having time stamps after the time stamp of the last published entry.

Figure 17:
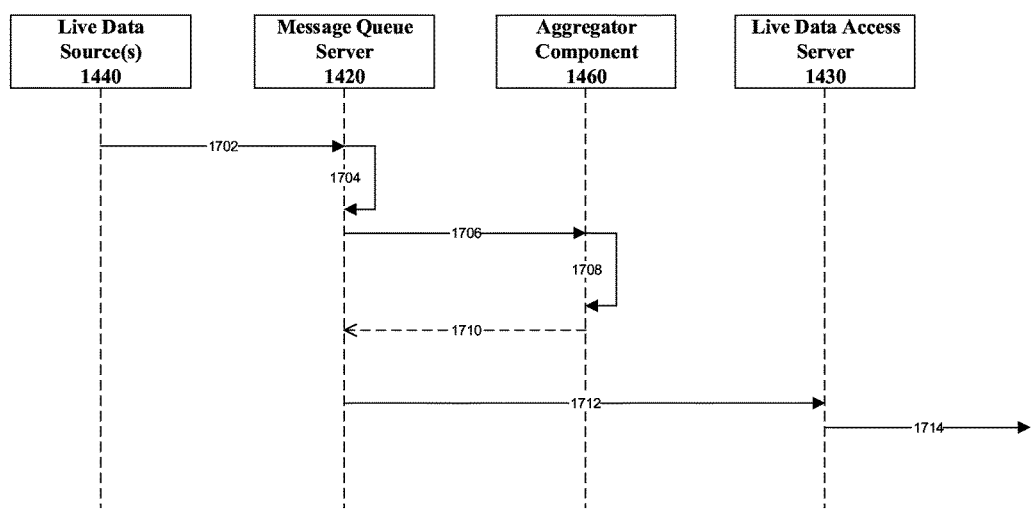
FIG. 17 illustrates an embodiment of a third message flow.

FIG. 17 illustrates an embodiment of a message flow 1700. Message flow 1700 may represent messages communicated among the components of system 1400. In particular, message flow 1700 may occur among one or more live data sources 1440, message queue server 1420, aggregator component 1460, and live data access server 1430. In message flow 1700, time flows from the top of the diagram toward the bottom. Message flow 1700 may represent messages communicated while live data is generated, collected, aggregated, re-published, and broadcast to subscribed clients. Of note is that aggregator component 1460 has the publisher role for the example of message flow 1700.

Message flow 1700 may begin similarly to message flow 600, when live data is received from live data source(s) 1440 at message queue server 1420 in message 1702. Message 1702 may be in the form of a topic entry, which may include, at least, a topic label and a data payload, as described above.

Message queue server 1420, upon receiving message 1702, may sort the data payload of message 1702 into a topic queue, such as topic queue 332-1 or 442-1, according to the topic label, in message 1704. In some embodiments, message queue server 1420, e.g. using a topic decoder 320, may format the data payload or otherwise alter the structure of the data payload. For example, the data payload may be inserted into an eXtensible Markup Language (XML) structure or into a Javascript Object Notation (JSON) structure. The embodiments are not limited to these implementations.

Once the data payload is inserted into a topic queue, message queue server 1420 may push the data payload to subscribers of the topic, e.g. to aggregator component 1460, in message 1706. Message 1706 may also be pushed (not shown) to live data access server 1430, when live data access server 1430 has subscribed to the topic queue selected in message 1704.

Aggregator component 1460, upon receipt of at least two messages 1706 for at least two different topics may parse and aggregate the at least two messages into one aggregated topic entry in message 1708. For example, aggregator component 1460 may extract data from a topic entry and separate each topic entry into individual data units. Aggregator component 1460 may then determine whether any of the parsed data is new and may assemble any new parsed data into one, new aggregated topic entry.

Aggregator component 1460 may publish the new aggregated topic entry back to message queue server 1420 in message 1710. Publishing may include passing the topic entry to message queue server 1420 for placement into the topic queue for the aggregated topic, or may include placing the data payload of the new aggregated topic entry directly into the topic queue for the aggregated topic.

Message queue server 1420 upon receipt of message 1710 may immediately push the new aggregated topic entry to any subscribers to the aggregated topic queue, e.g. live data access server 1430, in message 1712. In some embodiments, the other aggregator components, e.g. the worker-role aggregator components, may also be subscribers to the aggregated topic for the purpose of determining which topic entry was last published.

Live data access server 1430 may then immediately pass the topic entry received in message 1712 to any subscribing clients (not shown) in message 1714, as described above with respect to message flow 600.

Figure 18:
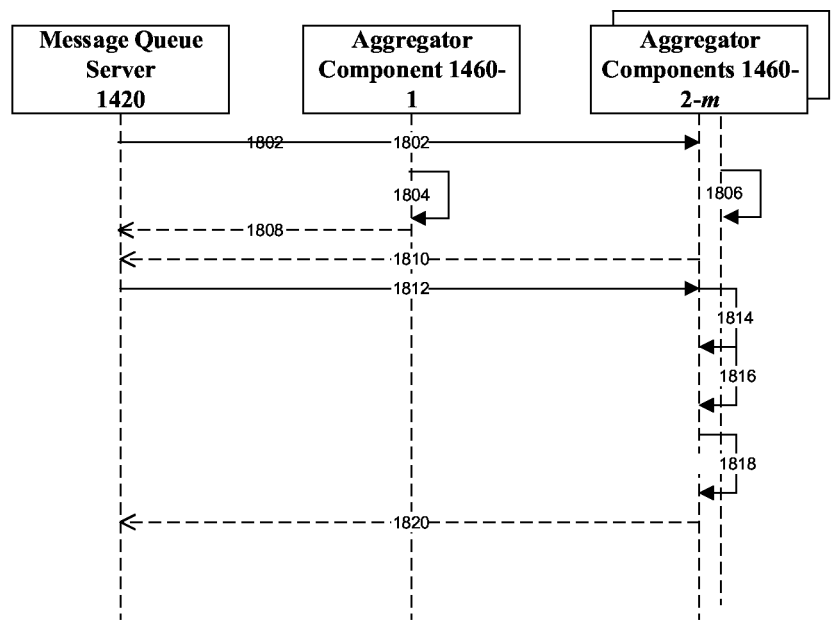
FIG. 18 illustrates an embodiment of a fourth message flow.

FIG. 18 illustrates an embodiment of a message flow 1800. Message flow 1800 may represent messages communicated among the components of system 1400. In particular, message flow 1800 may occur among message queue server 1420, and a plurality of aggregator components, including aggregator component 1460-1, and aggregator components 1460-2 through **1460-*m*. In message flow 1800, time flows from the top of the diagram toward the bottom. Message flow 1800 may represent messages communicated while maintaining an active publisher aggregator component. Of note is that aggregator component 1460-1 has the publisher role at the beginning of message flow 1800**.

Message flow 1800 may begin when message queue server 1420 pushes data payloads to subscribers of the topics in message 1802, as described above with respect to message flow 600. The subscribers may include the aggregator components 1460.

Each aggregator component 1460 may, upon receipt of a message 1802, parse and aggregate the data payloads into one aggregated topic entry as discussed above with respect to message flow 1700. Aggregator component 1460-1, the publisher, may perform these operations as message 1804. The other aggregator components, e.g., aggregator components 1460-2 through **1460-*m*, may additionally store the one aggregated topic entry in their respective buffers 1660. The parsing, aggregating and storing operations may be performed as message 1806**.

Aggregator component 1460-1, the publisher, may then publish the one aggregated topic entry back to message queue server 1420 in message 1808, as described with respect to message flow 1700.

Each of the aggregator components 1460 may publish a heartbeat topic entry to message queue server 1420 as messages 1810. A heartbeat topic entry may include, at least the host server identifier 1512 for the aggregator server host 1510 of an aggregator component 1460. The heartbeat topic entry may optionally include other information, such as a time stamp and/or a role indication, e.g. "publisher" or "worker". For the purpose of the example of message flow 1800, assume that aggregator component 1460-1 does not publish a heartbeat topic entry. For example, aggregator component 1460-1 may have stopped operating on its aggregator host server, or its aggregator host server may have lost its connection to a communication network used by the system 1400.

Message queue server 1420 may immediately push the heartbeat topic entries to the subscribing aggregator components in message 1812. One or more of the remaining aggregator components 1460-2 through **1460-*m* may detect, in message 1814, that the heartbeat topic entry for aggregator component 1460-1 is missing. The one or more of the remaining aggregator components 1460-2 through 1460-*m* may determine, in message 1816, whether it is next in line in a specified order. The one aggregator component 1460 that is next in line, e.g. aggregator component 1460-2, may promote itself to be publisher as part of the operation of message 1816**.

Aggregator component 1460-2, now the publisher, may determine whether any aggregated topic entries from its buffer 1660 have not been published yet in message 1818. For example, aggregator component 1460-2 may compare the sequence numbers or time stamps of a last topic entry published by message queue server 1420 to the sequence number(s) or time stamp(s) of the topic entries in its buffer 1660 and may publish all of the topic entries in buffer 1660 having larger sequence numbers or later time stamps than the last published topic entry.

When there are unpublished aggregated topic entries in its buffer 1160, aggregator component 1460-2 may publish the aggregated topic entries from its buffer 1660 to message queue server 1420 in message 1820.

Figure 19:
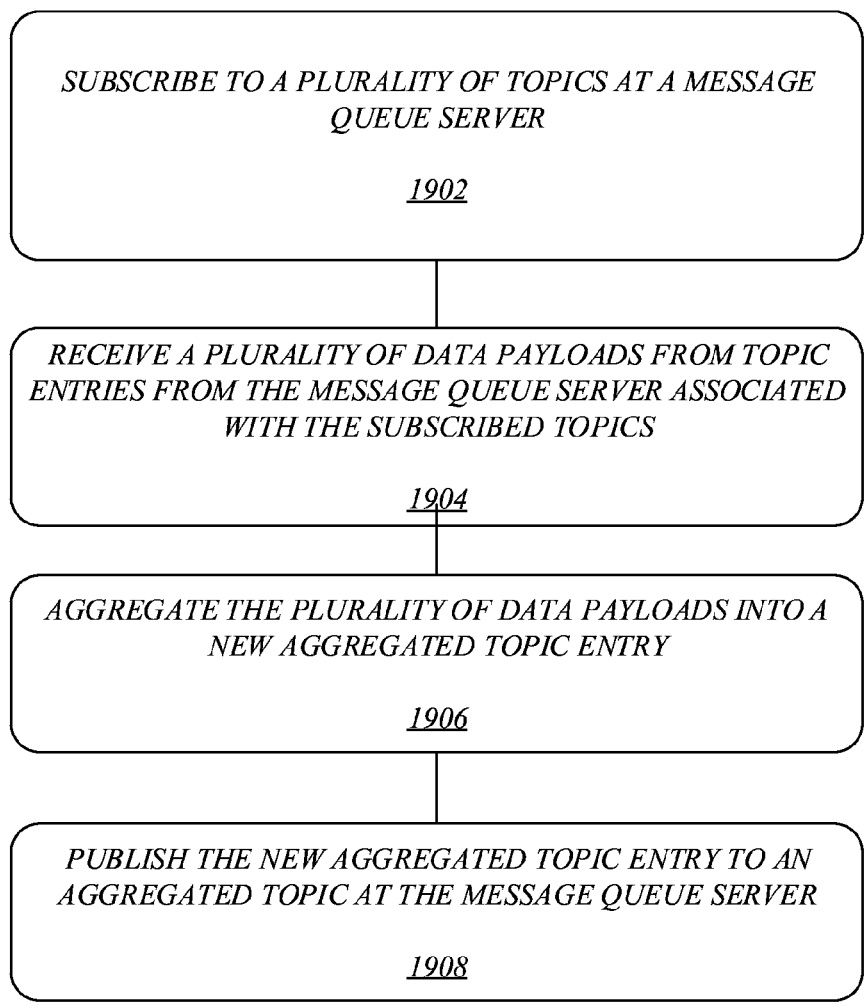
FIG. 19 illustrates a logic flow for the system of FIG. 14.

FIG. 19 illustrates a logic flow 1900. The logic flow 1900 may be representative of some or all of the operations executed by one or more embodiments described herein. In particular, the logic flow 1900 may represent the operations executed by an aggregator component, e.g. aggregator component 1610.

In the illustrated embodiment shown in FIG. 19, the logic flow 1900 may subscribe to a plurality of topics at a message queue server at block 1902. For example, an aggregator component 1460 may subscribe to a plurality of topics at message queue server 1420. Generally, the plurality of topics may be related to one live data event, such as, without limitation, a professional sports league draft, a multi-game tournament, an election, an on-going news story, and so forth.

The logic flow 1900 may receive a plurality of topic entries from the message queue server from the subscribed topics at block 1904. For example, an aggregator component 1460 may then receive topic entries from the topics subscribed to in block 902. The topic entries may include topic labels and data payloads that describe an aspect of the live data event.

The logic flow 1900 may aggregate the plurality of topic entries into a new aggregated topic entry at block 1906. For example, aggregator component 1460 may parse the plurality of topic entries to retrieve individual data units, and may assemble the parsed data into one, new aggregated topic entry. In an embodiment, unchanged data may be discarded, while new, or updated, data may be placed into the new topic entry.

The logic flow 1900 may publish the new aggregated topic entry to an aggregated topic at the message queue server at block 1908. For example aggregator component 1610 may provide the new aggregated topic entry to message queue server 1420 for placing into a topic queue for the aggregated topic, when the aggregator component 1460 has the publisher role.

Figure 20:
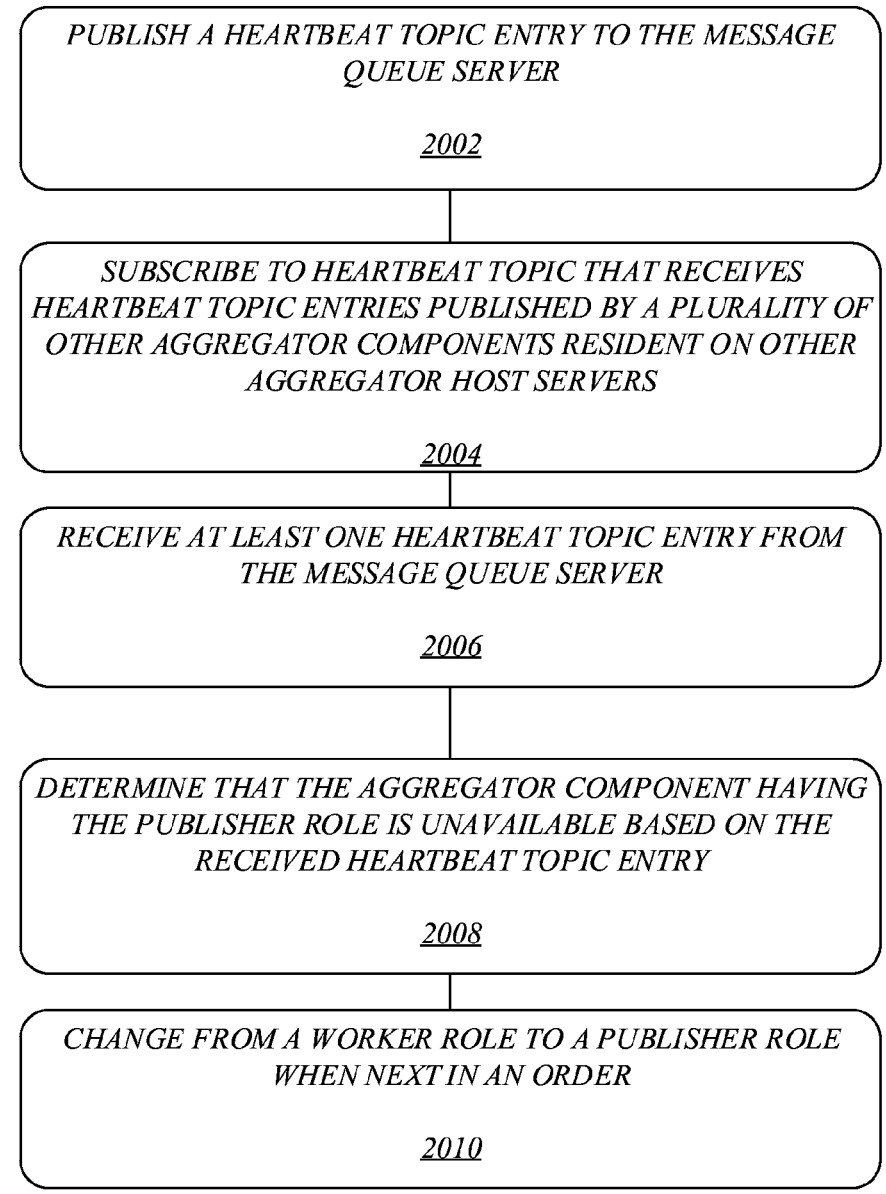
FIG. 20 illustrates a second logic flow for the system of FIG. 14.

FIG. 20 illustrates a logic flow 2000. The logic flow 2000 may be representative of some or all of the operations executed by one or more embodiments described herein. In particular, the logic flow 2000 may represent the operations executed by an aggregator component, e.g. aggregator component 1610, in a coordinated group of aggregator components to maintain an active publishing aggregator component at all times.

In the illustrated embodiment shown in FIG. 20, the logic flow 2000 may publish a heartbeat topic entry to the message queue server at block 2002. For example, an aggregator component 1610 may publish a heartbeat topic entry comprising an aggregator host server identifier 1512 of the aggregator host server device 1510 on which aggregator component 1610 is operating, to message queue server 1420. The heartbeat topic entry may be placed into a heartbeat topic queue directly by aggregator component 1610 or may be provided to message queue sever 1420 for placement in the heartbeat topic queue.

The logic flow 2000 may subscribe to a heartbeat topic published by a plurality of other aggregator components resident in other aggregator host servers at block 2004. For example, each of the aggregator components 1460-1, 1460-2 through 1460-m may subscribe to the heartbeat topic queue at message queue server 1420.

The logic flow 2000 may receive at least one heartbeat topic entry from the message queue server at block 2006. For example, the heartbeat topic entry may be received by aggregator component 1610. In some embodiments, the at least one heartbeat topic entry may, itself, be an aggregated topic, aggregated from the plurality of heartbeat topic entries from each aggregator component in system 1400.

The logic flow 2000 may determine, based on the received at least one heartbeat topic entry, that the aggregator component having the publisher role is unavailable at block 2008. For example, the receiving aggregator component 1610 may determine that the heartbeat for the publisher aggregator component is missing.

The logic flow 2000 may change from the worker role to the publisher role when the aggregator component is next in an order determined according to a sorting of the host server identifiers at block 2010. For example, aggregator component 1610, if it has a worker role, may sort the host server identifiers, and may determine which host server identifier comes next after the host server identifier of the aggregator host server of the unavailable aggregator component. If the next host server identifier matches the host server identifier for the aggregator host server of the aggregator component, then the aggregator component may assume the publisher role.

The embodiments therefore provide a quick, robust and efficient way to collect and transfer live event data to subscribed operators in substantially real-time.

Figure 21:
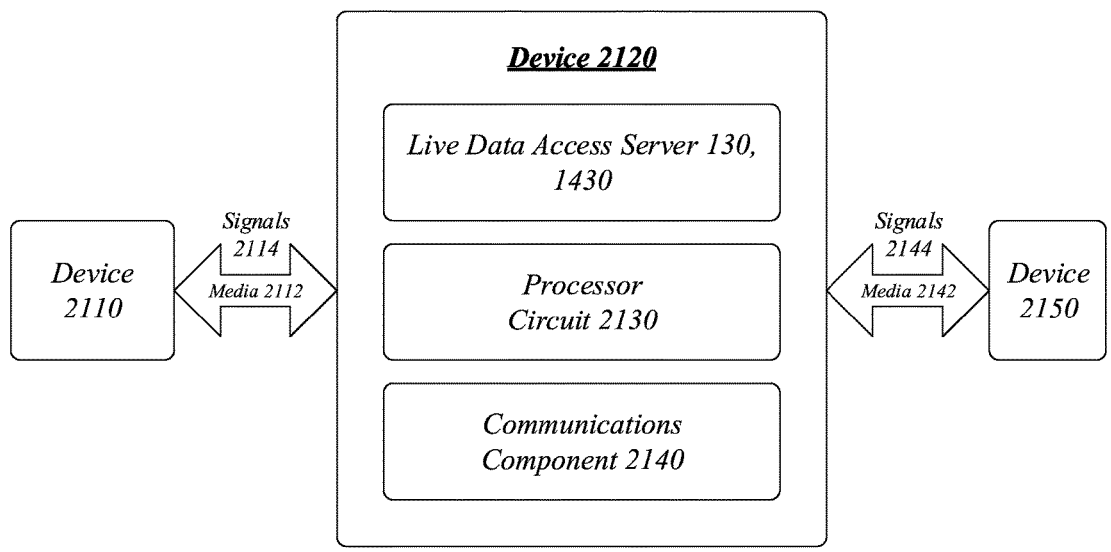
FIG. 21 illustrates an embodiment of a centralized system.

FIG. 21 illustrates a block diagram of a centralized system 2100. The centralized system 2100 may implement some or all of the structure and/or operations for the system 2100 in a single computing entity, such as entirely within a single device 2120.

The device 2120 may comprise some or all of the components of live data access server 130 or 1430, and may also include a processor circuit 2130 and a communications component 2140.

The device 2120 may execute communications operations or logic for the system 2100 using communications component 2140. The communications component 2140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 2140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 2112, 2142 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 2120 may communicate with other devices 2110, 2150 over communications media 2112, 2142, respectively, using communications signals 2114, 2144, respectively, via the communications component 2140. The devices 2110, 2150 may be internal or external to the device 2120 as desired for a given implementation. Devices 2110, 2150 may include, for example, client devices 110, and message queue servers 120, 1420.

Figure 22:
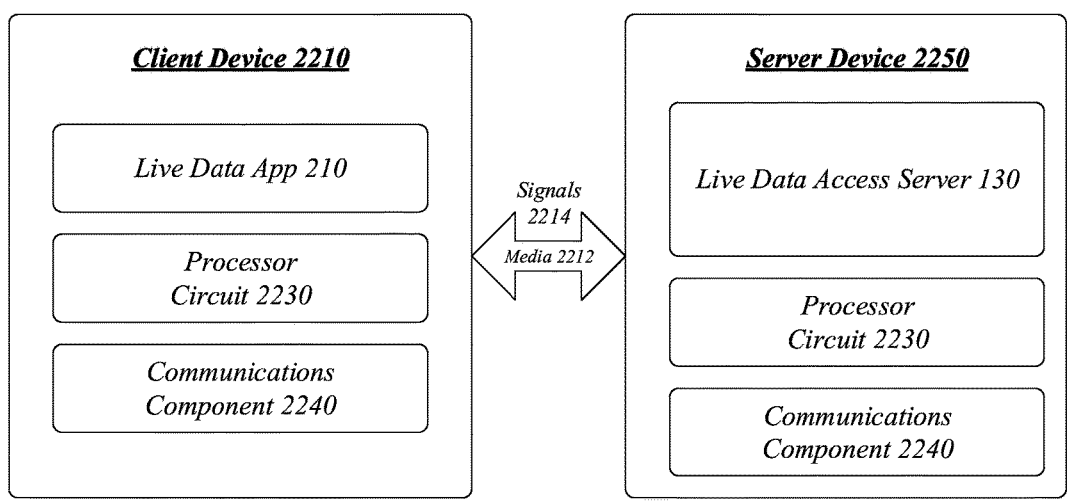
FIG. 22 illustrates an embodiment of a distributed system.

FIG. 22 illustrates a block diagram of a distributed system 2200. The distributed system 2200 may distribute portions of the structure and/or operations for the system 220 across multiple computing entities. Examples of distributed system 2200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 2200 may comprise a client device 2210 and a server device 2250. In general, the client device 2210 may be the same or similar to the client device 210, and the server device 2250 may be the same or similar to live data access server 130, 1430, message queue server 120, 1420, and/or aggregator host server 1450 as described with reference to FIGS. 1, 2, and 14. For instance, the client system 2210 and the server system 2250 may each comprise a processor circuit 2230 and a communications component 2240 which are the same or similar to the processor circuit 202 and the communications components 208, 308, 408, and 418, respectively, as described with reference to FIGS. 1-4. In another example, the devices 2210, 2250 may communicate over a communications media 2212 using communications signals 2214 via the communications components 2240.

The client device 2210 may comprise or employ one or more client programs that operate to perform various methodologies in accordance with the described embodiments. In one embodiment, for example, the client device 2210 may implement live data app 210.

The server device 2250 may comprise or employ one or more server programs that operate to perform various methodologies in accordance with the described embodiments. In one embodiment, for example, the server device 2250 may implement at least live data access server 130. The server device 2250 may also implement some or all of the components of server devices such as message queue server device 310 or 410, live data server device 450, and/or live access server device 510. The server device 2250 may implement message queue server 120, 1420, live data access server 130, 1430, and/or aggregator host server 1450. Client device 2210 may request and receive live data for various selected topics from server device 2250.

Figure 23:
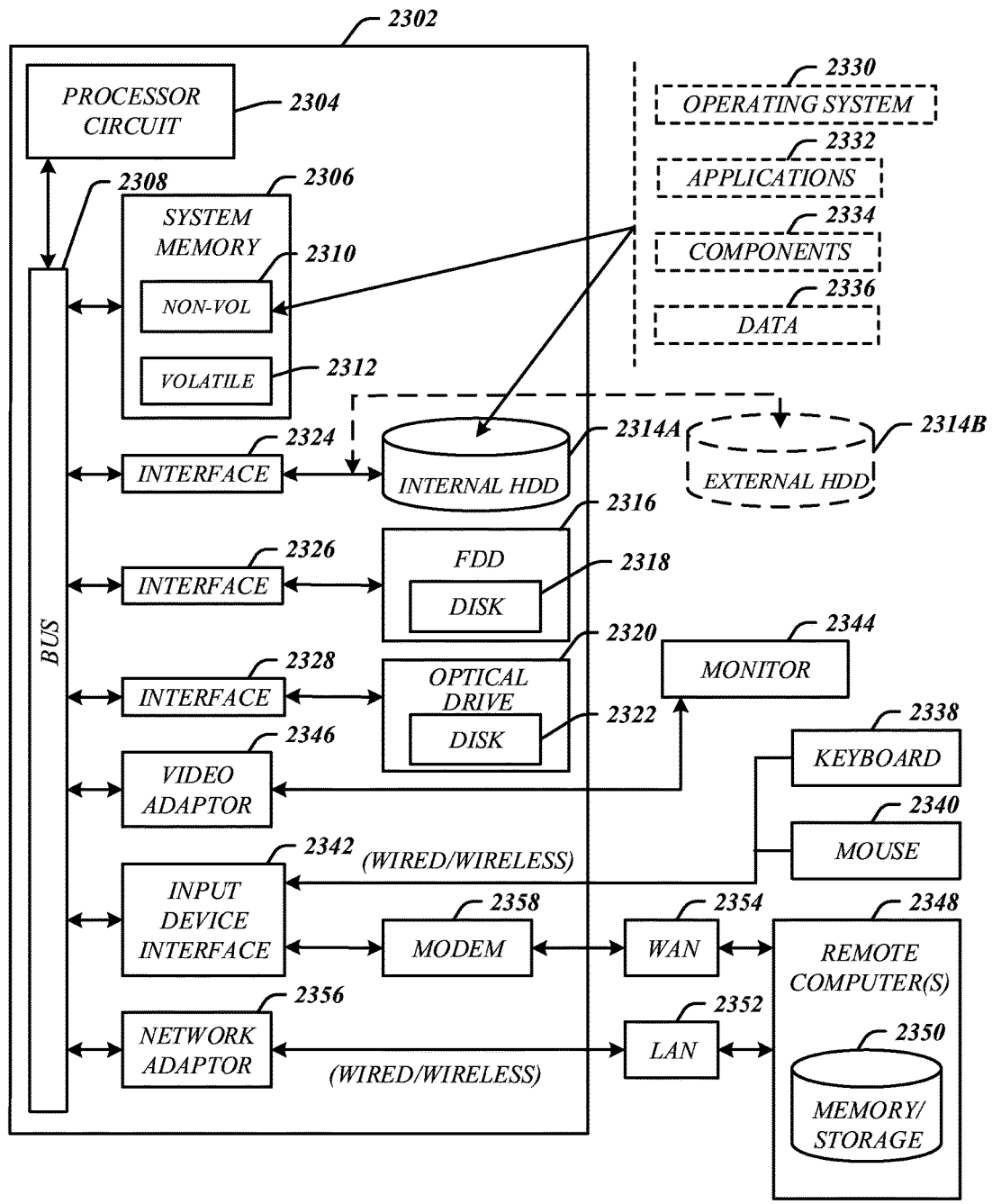
FIG. 23 illustrates an embodiment of a computing architecture.

FIG. 23 illustrates an embodiment of an exemplary computing architecture 2300 suitable for implementing various embodiments as previously described. In one embodiment, the computing architecture 2300 may comprise or be implemented as part of an electronic device. Examples of an electronic device may include those described with reference to FIGS. 1-5, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2300.

As shown in FIG. 23, the computing architecture 2300 comprises a processing unit 2304, a system memory 2306 and a system bus 2308. The processing unit 2304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2304.

The system bus 2308 provides an interface for system components including, but not limited to, the system memory 2306 to the processing unit 2304. The system bus 2308 can be any of several types of bus structure that may further interconnect to a memory bus (with or without a memory controller), a peripheral bus, and a local bus using any of a variety of commercially available bus architectures. Interface adapters may connect to the system bus 2308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 2306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 23, the system memory 2306 can include non-volatile memory 2310 and/or volatile memory 2312. A basic input/output system (BIOS) can be stored in the non-volatile memory 2310.

The computer 2302 may include various types of computer-readable storage media in the form of one or more lower speed memory units, including an internal (or external) hard disk drive (HDD) 2314A and 2314B, respectively, a magnetic floppy disk drive (FDD) 2316 to read from or write to a removable magnetic disk 2318, and an optical disk drive 2310 to read from or write to a removable optical disk 2322 (e.g., a CD-ROM or DVD). The HDD 2314, FDD 2316 and optical disk drive 2310 can be connected to the system bus 2308 by a HDD interface 2324, an FDD interface 2326 and an optical drive interface 2328, respectively. The HDD interface 2324 for external drive implementations can include at least one or both of Universal Serial Bus (USB) and IEEE 2394 interface technologies.

The drives and associated computer-readable storage media provide volatile and/or nonvolatile storage of data, data structures, computer-executable instructions, and so forth. For example, a number of program components can be stored in the drives and memory units 2310, 2312, including an operating system 2330, one or more application programs 2332, other program components 2334, and program data 2336. In one embodiment, the one or more application programs 2332, other program components 2334, and program data 2336 can include, for example, the various applications and/or components of the system 100.

An operator can enter commands and information into the computer 2302 through one or more wire/wireless input devices, for example, a keyboard 2338 and a pointing device, such as a mouse 2340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2304 through an input device interface 2342 that is coupled to the system bus 2308, but can be connected by other interfaces such as a parallel port, IEEE 1394 serial port, a game port, a USB port, an IR interface, and so forth.

A monitor 2344 or other type of display device is also connected to the system bus 2308 via an interface, such as a video adaptor 2346. The monitor 2344 may be internal or external to the computer 2302. In addition to the monitor 2344, a computer typically includes other peripheral output devices, such as speakers, printers, and so forth.

The computer 2302 may operate in a networked environment using logical connections via wire and/or wireless communications to one or more remote computers, such as a remote computer 2348. The remote computer 2348 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2350 is illustrated. The logical connections depicted include wire/wireless connectivity to a local area network (LAN) 2352 and/or larger networks, for example, a wide area network (WAN) 2354. Such LAN and WAN networking environments are commonplace in offices and companies, and facilitate enterprise-wide computer networks, such as intranets, all of which may connect to a global communications network, for example, the Internet.

When used in a LAN networking environment, the computer 2302 is connected to the LAN 2352 through a wire and/or wireless communication network interface or adaptor 2356. The adaptor 2356 can facilitate wire and/or wireless communications to the LAN 2352, which may also include a wireless access point disposed thereon for communicating with the wireless functionality of the adaptor 2356.

When used in a WAN networking environment, the computer 2302 can include a modem 2358, or is connected to a communications server on the WAN 2354, or has other means for establishing communications over the WAN 2354, such as by way of the Internet. The modem 2358, which can be internal or external and a wire and/or wireless device, connects to the system bus 2308 via the input device interface 2342. In a networked environment, program components depicted relative to the computer 2302, or portions thereof, can be stored in the remote memory/storage device 2350. It will be appreciated that the network connections shown are exemplary and other means of establishing a communications link between the computers can be used.

The computer 2302 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 24:
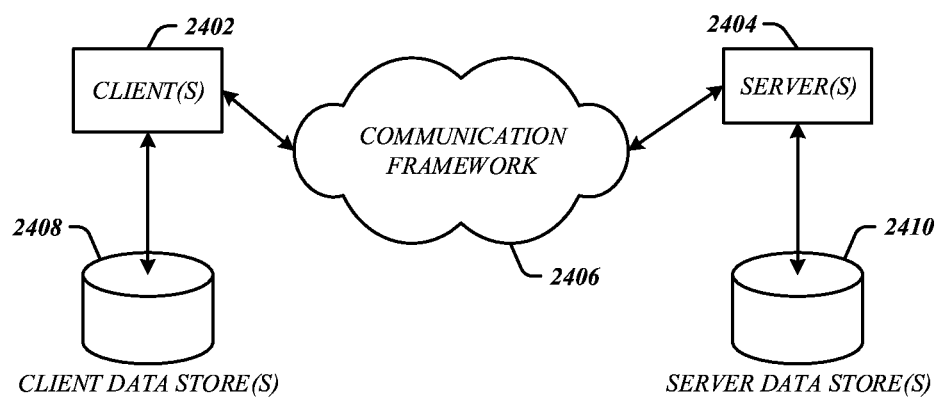
FIG. 24 illustrates an embodiment of a communications architecture.

FIG. 24 illustrates a block diagram of an exemplary communications architecture 2400 suitable for implementing various embodiments as previously described. The communications architecture 2400 includes various common communications elements, such as a transmitter, receiver, transceiver, radio, network interface, baseband processor, antenna, amplifiers, filters, power supplies, and so forth. The embodiments, however, are not limited to implementation by the communications architecture 2400.

As shown in FIG. 24, the communications architecture 2400 comprises includes one or more clients 2402 and servers 2404. The clients 2402 may implement the client device 110. The servers 2404 may implement any of server devices 310, 410, 450, 510. The clients 2402 and the servers 2404 are operatively connected to one or more respective client data stores 2408 and server data stores 2410 that can be employed to store information local to the respective clients 2402 and servers 2404, such as cookies and/or associated contextual information.

The clients 2402 and the servers 2404 may communicate information between each other using a communication framework 2406. The communications framework 2406 may implement any well-known communications techniques and protocols. The communications framework 2406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2402 and the servers 2404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   one or more processor circuits;
   a subscription component on a live data access server operatively executing on a processor circuit of the one or more processor circuits to receive a topic entry pushed from a message queue server that is separate from the live data access server, and to push the topic entry to a subscribed client device, wherein the push to the subscribed client device occurs substantially simultaneously with the message queue server receiving the topic entry from a live data source, wherein the topic entry comprises data associated with a topic that is associated with a live event and wherein the live data source is separate from any subscribed client device; and
   a communication component operatively coupled to the processor circuit of the one or more processor circuits to authenticate the subscribed client and then open a connection with the subscribed client device.

2. The apparatus of claim 1,
   the communication component receive a request for the topic from the subscribed client device.

3. The apparatus of claim 1, wherein the communication component comprises a websocket server component and listens for a websocket connection from the subscribed client device.

4. The apparatus of claim 1, the subscription component further to:
   receive a selection of the topic for subscription from the subscribed client device.

5. The apparatus of claim 1, the subscription component further to: subscribe to a requested topic at the message queue server.

6. A computer-implemented method, comprising:
   authenticating a client device and opening, by a live data access server, a connection with the client device;
   receiving a request for a topic from the client device, at the live data access server;
   subscribing, by the live data access server, to the requested topic at a message queue server that is separate from the live data access server;
   receiving a data payload of a topic entry associated with the requested topic pushed from the message queue server; and
   pushing the data payload to the client device via the connection substantially simultaneously with the message queue server receiving the topic entry from a live data source.

7. The computer-implemented method of claim 6, wherein the connection is a websocket connection.

8. The computer-implemented method of claim 6, comprising:
   receiving a selection of the topic for subscription from the client device.

9. The computer-implemented method of claim 6, wherein the requested topic is associated with a live event.

10. The computer-implemented method of claim 9, wherein the live event is a sporting event and a topic entry includes information about at least one of: a play, a score, a player injury, an error, a record, a substitution, a statistic, a player, a roster, and penalty.

11. At least one computer-readable storage memory unit comprising instructions that, when executed, cause a system to:
   receive a topic entry comprising a topic label and a data payload including information about a live event from a live data source at a message queue server, wherein the live data source comprises at least one of: a live data feed and a live data entry interface receiving data entered by a data observer of the live event, and wherein the live event is a sporting event and a data payload includes information about at least one of: a play, a score, a player injury, an error, a record, a substitution, a statistic, a player, a roster, and penalty;
   parse the topic label from the topic entry by the message queue server;
   identify one or more topic queues of a plurality of topic queues according to the topic label by the message queue server;
   place the data payload of the topic entry into the identified one or more topic queues of the plurality of topic queues by the message queue server substantially simultaneously with the identifying of the one or more topic queues; and
   push the data payload from the identified one or more topic queues from the message queue server to a live data access server that is separate from the message queue server that has subscribed to the topic of the identified one or more topic queues.

12. A computer-implemented method, comprising:
   receiving, at a live data access server, a data payload of a topic entry associated with a requested topic pushed from a message queue server that is separate from the live data access server; and
   pushing the data payload to a subscribed client device, via an open connection between the subscribed client device and the live data access server, wherein the pushing to the subscribed client device occurs substantially simultaneously with the message queue server receiving the topic entry from a live data source, wherein the live data source is separate from any subscribed client device and wherein the client device is authenticated before the connection is opened.

13. The computer-implemented method of claim 12, wherein the requested topic is associated with a live event.

14. The computer-implemented method of claim 13, wherein the data payload comprises information about at least one of an occurrence and a participant at the live event.

15. The computer-implemented method of claim 13, wherein the live event is a sporting event and a topic entry includes information about at least one of: a play, a score, a player injury, an error, a record, a substitution, a statistic, a player, a roster, and penalty.

* * * * *